United States Patent
Dave et al.

(10) Patent No.: US 10,226,817 B2
(45) Date of Patent: Mar. 12, 2019

(54) MATERIAL QUALIFICATION SYSTEM AND METHODOLOGY

(71) Applicant: Sigma Labs, Inc., Santa Fe, NM (US)

(72) Inventors: Vivek R. Dave, Concord, NH (US); Mark J. Cola, Santa Fe, NM (US)

(73) Assignee: SIGMA LABS, INC., Sante Fe, NM (US)

( * ) Notice: Subject to any disclaimer, the term of this patent is extended or adjusted under 35 U.S.C. 154(b) by 469 days.

(21) Appl. No.: 14/995,183

(22) Filed: Jan. 13, 2016

(65) Prior Publication Data

US 2016/0199911 A1    Jul. 14, 2016

Related U.S. Application Data

(63) Continuation of application No. PCT/US2016/013303, filed on Jan. 13, 2016.
(Continued)

(51) Int. Cl.
*B22F 3/10* (2006.01)
*B22F 3/105* (2006.01)
(Continued)

(52) U.S. Cl.
CPC .......... *B22F 3/1055* (2013.01); *B29C 64/386* (2017.08); *B22F 2003/1057* (2013.01);
(Continued)

(58) Field of Classification Search
None
See application file for complete search history.

(56) References Cited

U.S. PATENT DOCUMENTS

| 4,041,476 A | 8/1977 | Swainson et al. |
| 4,247,508 A | 1/1981 | Housholder et al. |
| (Continued) | | |

FOREIGN PATENT DOCUMENTS

| DE | 102013206542 A1 | 10/2014 |
| EP | 1700686 A2 | 9/2006 |
| (Continued) | | |

OTHER PUBLICATIONS

Hamilton, et al., "Radiant-interchange configuration factors", NASA TN2836, Dec. 1, 1952, 111.
(Continued)

*Primary Examiner* — Jason Lin
(74) *Attorney, Agent, or Firm* — Kilpatrick Townsend & Stockton LLP

(57) ABSTRACT

Various ways in which material property variations of raw materials used in additive manufacturing can be identified and accounted for are described. In some embodiments, the raw material can take the form of powdered metal. The powdered metal can have any number of variations including the following: particle size variation, contamination, particle composition and particle shape. Prior to utilizing the powders in an additive manufacturing operation, the powders can be inspected for variations. Variations and inconsistencies in the powder can also be identified by monitoring an additive manufacturing with one or more sensors. In some embodiments, the additive manufacturing process can be adjusted in real-time to adjust for inconsistencies in the powdered metal.

16 Claims, 25 Drawing Sheets

Related U.S. Application Data

(60) Provisional application No. 62/103,034, filed on Jan. 13, 2015, provisional application No. 62/235,232, filed on Sep. 30, 2015.

(51) Int. Cl.
*B29C 64/386* (2017.01)
*B33Y 10/00* (2015.01)
*B33Y 30/00* (2015.01)
*B33Y 50/02* (2015.01)

(52) U.S. Cl.
CPC ............ *B33Y 10/00* (2014.12); *B33Y 30/00* (2014.12); *B33Y 50/02* (2014.12); *Y02P 10/295* (2015.11)

(56) References Cited

U.S. PATENT DOCUMENTS

| | | | |
|---|---|---|---|
| 4,323,756 A | 4/1982 | Brown et al. | |
| 4,575,330 A | 3/1986 | Hull | |
| 4,863,538 A | 9/1989 | Deckard | |
| 5,272,027 A | 12/1993 | Dillenbeck et al. | |
| 6,261,493 B1* | 7/2001 | Gaylo | B29C 33/3814 249/134 |
| 6,357,910 B1* | 3/2002 | Chen | G01J 5/041 374/127 |
| 6,483,596 B1 | 11/2002 | Philippi et al. | |
| 6,547,994 B1* | 4/2003 | Monkhouse | B29C 64/165 264/113 |
| 6,554,600 B1 | 4/2003 | Hofmann et al. | |
| 6,672,343 B1 | 1/2004 | Perret et al. | |
| 6,824,714 B1 | 11/2004 | Türck et al. | |
| 6,932,935 B1 | 8/2005 | Oberhofer et al. | |
| 7,127,304 B1* | 10/2006 | Gould | G05B 13/024 700/20 |
| 7,153,463 B2 | 12/2006 | Leuterer et al. | |
| 7,229,272 B2 | 6/2007 | Leuterer et al. | |
| 7,419,632 B2 | 9/2008 | Keller et al. | |
| 7,601,422 B2 | 10/2009 | Mueller et al. | |
| 7,628,600 B2 | 12/2009 | Perret et al. | |
| 7,661,948 B2 | 2/2010 | Perret et al. | |
| 7,665,979 B2 | 2/2010 | Heugel et al. | |
| 7,674,107 B2 | 3/2010 | Perret et al. | |
| 7,686,605 B2 | 3/2010 | Perret et al. | |
| 7,713,048 B2 | 5/2010 | Perret et al. | |
| 7,740,683 B2 | 6/2010 | Thorsson et al. | |
| 7,820,241 B2 | 10/2010 | Perret et al. | |
| 7,837,458 B2 | 11/2010 | Perret et al. | |
| 7,847,057 B2 | 12/2010 | Mueller et al. | |
| 7,850,885 B2 | 12/2010 | Philippi et al. | |
| 7,891,095 B2 | 2/2011 | Thorsson et al. | |
| 7,901,604 B2 | 3/2011 | Oberhofer et al. | |
| 7,931,462 B2 | 4/2011 | Mattes et al. | |
| 7,946,840 B2 | 5/2011 | Perret et al. | |
| 7,976,302 B2 | 7/2011 | Perret et al. | |
| 8,031,384 B2 | 10/2011 | Schimitzek et al. | |
| 8,034,279 B2 | 10/2011 | Dimter et al. | |
| 8,073,315 B2 | 12/2011 | Philippi et al. | |
| 8,075,814 B2 | 12/2011 | Fruth et al. | |
| 8,083,513 B2 | 12/2011 | Montero-Escuder et al. | |
| 8,124,192 B2 | 2/2012 | Paasche et al. | |
| 8,137,739 B2 | 3/2012 | Philippi et al. | |
| 8,172,562 B2 | 5/2012 | Mattes et al. | |
| 8,186,990 B2 | 5/2012 | Perret et al. | |
| 8,260,447 B2 | 9/2012 | Mattes et al. | |
| 8,299,208 B2 | 10/2012 | Mueller et al. | |
| 8,303,886 B2 | 11/2012 | Philippi et al. | |
| 8,313,087 B2 | 11/2012 | Hesse et al. | |
| 8,317,508 B2 | 11/2012 | Bokodi et al. | |
| 8,366,432 B2 | 2/2013 | Perret et al. | |
| 8,414,281 B2 | 4/2013 | Schleiss et al. | |
| 8,420,001 B2 | 4/2013 | Leuterer et al. | |
| 8,501,075 B2 | 8/2013 | Philippi et al. | |
| 8,525,071 B2 | 9/2013 | Leuterer et al. | |
| 8,658,078 B2 | 2/2014 | Weidinger et al. | |
| 8,710,144 B2 | 4/2014 | Weiss et al. | |
| 8,734,694 B2 | 5/2014 | Perret et al. | |
| 8,784,720 B2 | 7/2014 | Göbner et al. | |
| 8,784,721 B2 | 7/2014 | Philippi et al. | |
| 8,803,073 B2 | 8/2014 | Philippi et al. | |
| 2008/0127186 A1* | 5/2008 | Kanodia | G05B 23/0216 718/101 |
| 2008/0262659 A1 | 10/2008 | Huskamp et al. | |
| 2009/0206065 A1* | 8/2009 | Kruth | B22F 3/1055 219/121.66 |
| 2009/0312851 A1* | 12/2009 | Mishra | G05B 17/02 700/30 |
| 2010/0161102 A1 | 6/2010 | Mattes et al. | |
| 2011/0046766 A1* | 2/2011 | Mienhardt | G05B 19/4083 700/103 |
| 2011/0196525 A1* | 8/2011 | Bogue | B26D 5/00 700/103 |
| 2013/0114082 A1* | 5/2013 | Sailor | G01N 21/171 356/402 |
| 2014/0004626 A1* | 1/2014 | Xu | H01L 21/302 438/5 |
| 2014/0039662 A1* | 2/2014 | Boyer | B29C 67/0051 700/118 |
| 2014/0265046 A1* | 9/2014 | Burris | B23K 26/034 264/497 |
| 2015/0061170 A1* | 3/2015 | Engel | B29C 67/0088 264/40.1 |
| 2015/0104802 A1* | 4/2015 | Reep | C12Q 1/6802 435/6.12 |
| 2015/0147424 A1 | 5/2015 | Bibas | |
| 2015/0177158 A1 | 6/2015 | Cheverton | |
| 2015/0261196 A1 | 9/2015 | Wilson et al. | |
| 2015/0268099 A1 | 9/2015 | Craig et al. | |
| 2015/0321422 A1 | 11/2015 | Boyer | |
| 2016/0098825 A1 | 4/2016 | Dave et al. | |
| 2016/0176114 A1 | 6/2016 | Tsai et al. | |
| 2016/0184893 A1 | 6/2016 | Dave et al. | |
| 2016/0193696 A1* | 7/2016 | Mcfarland | B22F 3/1055 219/76.12 |
| 2016/0236279 A1 | 8/2016 | Ashton et al. | |
| 2018/0036949 A1 | 2/2018 | Lopez et al. | |

FOREIGN PATENT DOCUMENTS

| | | |
|---|---|---|
| EP | 2918395 A1 | 9/2015 |
| WO | 2013044047 A1 | 3/2013 |
| WO | 2013128416 A2 | 9/2013 |
| WO | 2014144255 A2 | 9/2014 |
| WO | 2014159758 A1 | 10/2014 |
| WO | 2016115284 | 7/2016 |

OTHER PUBLICATIONS

Kandula, et al., "On the Effective Therman conductivity of porous packed Beds with uniform Shperical particles", Journal of Porous Media, 2011, 919-926.

Korner, et al., "Fundamental consolidation mechanisms during selective beam melting of powders", Modeling and Simulation in Materials Science and Engineering, Nov. 8, 2013, 18 pages.

PCT/US2016/013303, "International Search Report and Written Opinion", dated Mar. 29, 2016, 12 pages.

EP16737843.9, "Extended European Search Report", dated Sep. 28, 2018, 13 pages.

U.S. Appl. No. 15/282,822, "Notice of Allowance", dated Sep. 28, 2018, 18 pages.

U.S. Appl. No. 15/984,104, "First Action Interview Pilot Program Pre-Interview Communication", dated Dec. 12, 2018, 7 pages.

* cited by examiner

| CATEGORY | ATTRIBUTE |
| --- | --- |
| Powder Properties | Particle Size Distribution |
| | Particle Morphology |
| | Particle Surface Area |
| | Particle Composition |
| | Contaminants |
| | State of Surface Oxidation |
| Thermophysical Properties | Powder Tap Density |
| | Density of Bed as Put Down by spreading / recoating process |
| | Thermal Conductivity of Powder bed before Sintering |
| | Heat Capacity of Powder Bed before Sintering |
| | Surface tension of molten metal during sintering |
| | Wetting Contact Angle between Liquid and Powder Bed |
| Optical Properties | Optical Absorptivity of Powder Bed Before Sintering and While in Solid State |
| | Optical Absorptivity of Liquid |
| | Potential for Non-Imaging Optical Concentration – a combination of particle morphology, particle size distribution and surface oxidation state |

FIG. 1

| CATEGORY | ATTRIBUTE |
| --- | --- |
| Microstructural Aspects | Microstructure – grain size, precipitates, dendrite arm spacing, etc. |
| | As deposited Grain Boundary Character Distribution |
| | Pore Volume Fraction |
| | Pore Size Distribution |
| | Pore Morphology |
| Post Manufacture Processing Aspects | Shrinkage |
| | Residual Stress |
| | Distortion |
| | Heat Treatment / Hot Isostatic Pressing Response |
| | Recrystallization / Aging Response |
| Post Manufacture Material Properties | Final Density |
| | Young's Modulus |
| | Yield Strength |
| | Ductility |
| | Low Cycle Fatigue |
| | High Cycle Fatigue |
| | Thermo-Mechanical Fatigue |
| | Crack Growth |
| | Fracture Toughness |
| | Impact Strength |
| | Hardness |

FIG. 2

| CATEGORY OF MEASURMENT | EXAMPLES OF THIS MEASUREMENT TYPE |
|---|---|
| IN-Process, i.e., measurements taken during the manufacturing process | Stationary (Eulerian) thermal field data |
| | Moving (Lagrangian) thermal field data, i.e. in the reference frame of the moving heat source |
| | Cooling rate as directly measured by Eulerian, stationary thermal sensors |
| | Cooling rate as inferred by moving, Lagrangian sensors |
| | Size of molten pool as measured by imaging Lagrangian Sensor |
| POST-Process, i.e. measurements made after the manufacturing process is completed or at an intermediate state of the manufacturing process | Geometry, size and shape of melt region in cross-section as measured by metallographic analysis |
| | Primary dendrite arm spacing as measured by metallographic analysis |
| | Secondary dendrite arm spacing as measured by metallographic analysis |
| | Top surface width of the melt region as measured non-destructively by a variety of imaging or non-imaging sensors |

FIG. 11

MATERIAL QUALIFICATION SYSTEM AND METHODOLOGY

CROSS-REFERENCES TO RELATED APPLICATIONS

This application claims priority under 35 USC 119(e) to U.S. Provisional Patent Application No. 62/103,034 filed on Jan. 13, 2015, and entitled "MATERIAL QUALIFICATION SYSTEM AND METHODOLOGY FOR MANUFACTURING PROCESSES," and to Application No. 62/235,232 filed on Sep. 30, 2015 and entitled "SYSTEMS AND METHODS FOR ADDITIVE MANUFACTURING OPERATIONS" the disclosures of which is incorporated by reference in their entirety and for all purposes.

FIELD

The present invention relates to the qualification of materials for manufacturing processes. More specifically, it relates to the qualification of such materials for Additive Manufacturing processes, which are those manufacturing processes that utilize a means of sequential and incremental material addition to create a solid object.

BACKGROUND OF THE INVENTION

Additive manufacturing, or the sequential assembly or construction of a part through the combination of material addition and applied energy, takes on many forms and currently exists in many specific implementations and embodiments. Additive manufacturing can be carried out by using any of a number of various processes that involve the formation of a three dimensional part of virtually any shape. The various processes have in common the sintering, curing or melting of liquid, powdered or granular raw material, layer by layer using ultraviolet light, high powered laser, or electron beam, respectively. Unfortunately, even after an additive manufacturing process is well understood, the process can be disrupted by variations in or contamination of raw materials used in the additive manufacturing process. Consequently, methods for mitigating or avoiding the use of raw materials that can change the results of an additive manufacturing process are desired.

SUMMARY OF THE INVENTION

The described embodiments are related to a large subcategory of additive manufacturing, which involves using an energy source that takes the form of a moving region of intense thermal energy. In the event that this thermal energy causes physical melting of the added material, then these processes are known broadly as welding processes. In welding processes, the material, which is incrementally and sequentially added, is melted by the energy source in a manner similar to a fusion weld.

When the added material takes the form of layers of powder, after each incremental layer of powder material is sequentially added to the part being constructed, the heat source melts the incrementally added powder by welding regions of the powder layer creating a moving molten region, hereinafter referred to as the weld pool, so that upon solidification they become part of the previously sequentially added and melted and solidified layers below the new layer that includes the part being constructed. As additive machining processes can be lengthy and include any number of passes of the weld pool, avoiding unsuccessful part builds can be very beneficial. By adding a materials qualification subsystem to an additive manufacturing system, problems caused by added material variations can be mitigated or in some cases completely avoided.

In some embodiments, when a new batch or lot of added materials is introduced, the materials qualification system can be configured to identify variations during the build process by comparing sensor readings taken during the build process to sensor readings taken during a previous successful build process. Any differences noted by the comparison of sensor readings can be used in determining material properties of the new batch or lot. In some embodiments, a processor can take readings from the sensor systems and apply the sensor readings to an added material model capable of using the sensor reading to determine how or in what ways the added material differs from a standard or previous batch/lot of added materials.

In some embodiments, the materials qualification can instead or additionally be configured to adjust parameters of the additive machining system to account for any known variations in the added materials prior to initiating a build process. For example, added materials taking the form of metal powder may have a slightly different particle size than those obtained from a previous manufacturer. By conducting materials evaluation beforehand, at least some of these material variations can be known and used as input variables for improving the process. In some cases, adjustment to the parameters can allow the build process to produce acceptable parts without spending substantial amounts of time or materials conducting build processes using parameters not well-suited to the variations in the new batches or lots of added materials. In some embodiments, the adjusted parameters used with the new or unknown composition added materials can be further refined with sensor readings taken during initial build processes using the aforementioned initial parameter adjustments. These sensor readings can then be used to apply additional adjustments to the parameters used in the build process. In this way, the additive manufacturing system can be rapidly recalibrated to account for variations in the added materials.

In some embodiments, the materials qualification system can be configured to identify added material variations that cannot be addressed by parameter adjustment. For example, in some embodiments, particle size variations due to particle morphology and/or poor particle size control can prevent parameter adjustments alone from achieving a viable build process. Even minor variations in particle size can result in particles that melt at substantially different temperatures. The varied melting temperatures can result in one or more undesirable outcomes including: unmelted added materials trapped in a part and vaporized added material leaving voids or pits in the surface of a part. In severe cases, when this type of variation is identified by sensors during a product build, the build process can be terminated early to save time and material costs.

In some embodiments, in-process sensor readings can be configured to confirm a lot or batch of powder that has been recycled or has been sitting around for long periods of time is still performing at acceptable levels or at least not exhibiting any behaviors associated with material degradation.

The materials qualification system and methodology can be applied to systems using powdered or particulate materials, either of plastic or metal composition. The materials qualification system is also applicable to a wire material form factor in the case of metallic materials, and a resin or other non-Newtonian fluid in the case of a polymeric material. Other example embodiments can provide for a materials qualification system and methodology which is capable of characterizing and quantifying various physical attributes and properties of the material types and categories mentioned above including, but not limited to: physical properties like density; material composition; properties relating to surface area of powder or particulate materials; properties relating to the particle shape and morphology for powder materials; properties relating to the particle size distribution for powder materials; properties relating to thermophysical quantities such as specific heat, thermal conductivity, and thermal diffusivity; properties relating to minor elements, contamination, or the presence or absence of adsorbed fluids or gases; properties relating to the state of surface oxidation of powder materials; properties relating to the wettability and surface tension of powder materials both in their solid and liquid forms; properties relating to the energy absorption characteristics of powder materials with respect to different types of incident radiation such as photons or beta particles; and other similar such properties and attributes not specifically enumerated herein but that will have an impact on the overall characterization of the said materials.

There can also be variations in the attributes of the powdered materials over time that can be accounted for by the material qualification system. These variations can be caused by lot to lot variations, supplier to supplier variations, variations induced by recycling the powders, i.e. reusing un-sintered or unfused powders, variations caused by powder storage, or other variations which can result from intrinsic or extrinsic factors with respect to the manufacturing process. It is therefore a desirable attribute of a quality system for Additive Manufacturing to have a system and a methodology for directly comparing the attributes, properties, and resultant manufacturing performance of different powders, or the same powder over time. In some cases a model could be created to account for expected degradation in material quality or consistency as a function of time and/or storage conditions.

In one embodiment an additive manufacturing system is disclosed and includes: a heat source configured to direct energy towards a layer of powder arranged on a powder bed in a pattern that corresponds to a shape of a part; an optical sensing system configured to determine a temperature associated with a portion of the part; and a controller configured to receive sensor data from the optical sensing system during an additive manufacturing operation using a first batch of powder and standardized system parameters and to compare readings taken by the optical sensing system to readings taken by the optical sensing system during one or more previous additive manufacturing operations that used a second batch of powder. The second batch of powder is known to produce the part successfully using the standardized system parameters.

In another embodiment an additive manufacturing method is disclosed and includes: using a first batch of powder in an additive manufacturing operation; carrying out an additive manufacturing operation to produce a part using standardized settings; monitoring the additive machining operation with one or more sensors configured to measure heat emitted during the additive machining operation; comparing data recorded by the sensors to data recorded during a previous additive machining operation that produced the calibration part using a second batch of powder with the standardized settings, wherein the second batch of powder is known to produce desired results during additive manufacturing operations; and determining one or more characteristics of the first batch of powder from the comparison of the data.

In yet another embodiment, an additive manufacturing method is disclosed that includes the following: measuring material characteristics of a batch of powder; adjusting parameters of an additive manufacturing operation in accordance with the measured material characteristics; and performing the additive manufacturing process with the batch of powder using the adjusted parameters to produce a part.

BRIEF DESCRIPTION OF THE DRAWINGS

The disclosure will be readily understood by the following detailed description in conjunction with the accompanying drawings, wherein like reference numerals designate like structural elements, and in which:

FIG. 1 shows a table enumerating some examples of various material attributes and properties that can impact quality of a part produced by an additive manufacturing process;

FIG. 2 shows a table listing different aspects of equivalence in terms of product attributes and post-manufacturing properties;

FIG. 11 shows a chart listing several possible ways of obtaining experimentally determined thermal field data;

DETAILED DESCRIPTION

Figure 3:
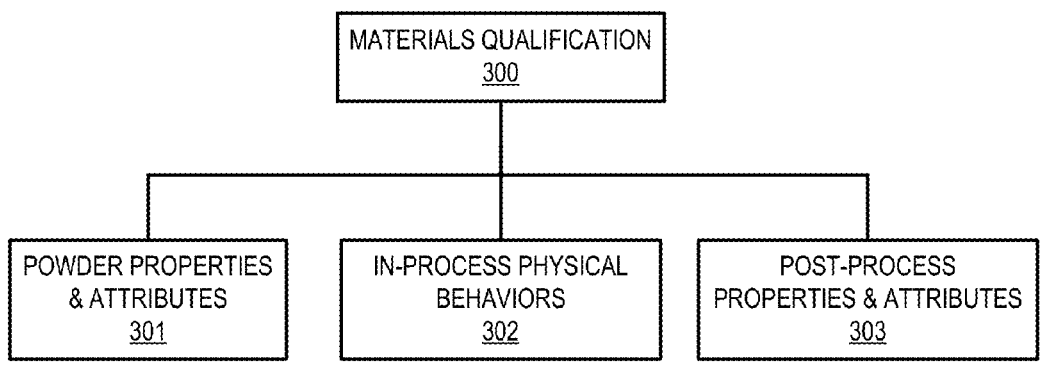
FIG. 3 shows how Materials Qualification can be measured and characterized using multiple factors.

Additive manufacturing, when performed using a concentrated moving heat source that impinges upon a powder bed, depends on a multitude of attributes and properties that are associated with the powder material itself.

FIG. 1 shows a table enumerating some examples of various material attributes and properties that can impact quality of a part produced by an additive manufacturing process. It is seen that many parameters can have a significant impact on the powder sintering process, and that equivalence of powders is a multi-dimensional, multi-parameter problem. A combination of powder properties, thermophysical properties, and optical properties must be carefully matched to ensure equivalent outcomes. It is instructive to focus on the post-process aspects of the powder sintering process. Equivalence of results or outcome of the Additive Manufacturing process is another key aspect of establishing equivalence of different materials at the input end.

In particular, powder properties can include but are not limited to: Particle size distribution; Particle morphology; Particle surface area; Particle chemical composition; Specific contaminate types; State of surface oxidation; and other particle attributes that could impact quality. Thermophysical properties can include but are not limited to: Powder tap density; Density of a powder bed as put down by spreading mechanism/recoating process before next layer is sintered; Heat capacity of powder bed before sintering (as a composite comprised of powder and gas); Thermal conductivity of powder bed before sintering (as a composite comprised of powder and gas); Surface tension of molten metal during sintering; and Wetting contact angle between molten metal and unmelted powders/powder bed. Optical properties can include but are not limited to: Optical absorptivity of powder bed before sintering while it is in a solid state; Optical absorptivity of molten liquid; Potential for non-imaging concentration of optical/radiative energy FIG. 2 shows a table listing different aspects of equivalence in terms of product attributes and post-manufacturing properties. The equivalence of powders therefore implies a combination of properties and attributes enumerated in the tables in FIG. 1 and FIG. 2 as well as metrics relating to the in-process physical behavior of the manufacturing process itself.

In particular, micro-level metallurgical examination can include the measurement of any of the following: Grain size; Grain orientation; Grain morphology and growth direction in relation to thermal gradients; Dendrite arm spacing; Secondary dendrite arm spacing; Other microstructural characteristics of interest—precipitates, etc.; Voids and other defects; Cracks; Partially molten zone adjacent to melt track/powder bed interface; and Evidence of liquid infiltration of the powder bed.

The other post-process characterizations and properties can include but not be limited to: Residual stress and distortion; Mechanical properties and other post-process properties.

FIG. 3 shows how Materials Qualification 300 can be measured and characterized using multiple factors. Determining equivalency of powders can be accomplished using one or more of the following: measuring powder properties and attributes 301 prior to initiating a build process, measuring in-process physical behaviors 302 that occur during the manufacturing process, and measuring post-process properties and attributes 303 of the finished article. This description expounds and instructs a detailed methodology by which all three of the aspects of Materials Qualification shown in FIG. 3 are integrally combined.

Figure 4:
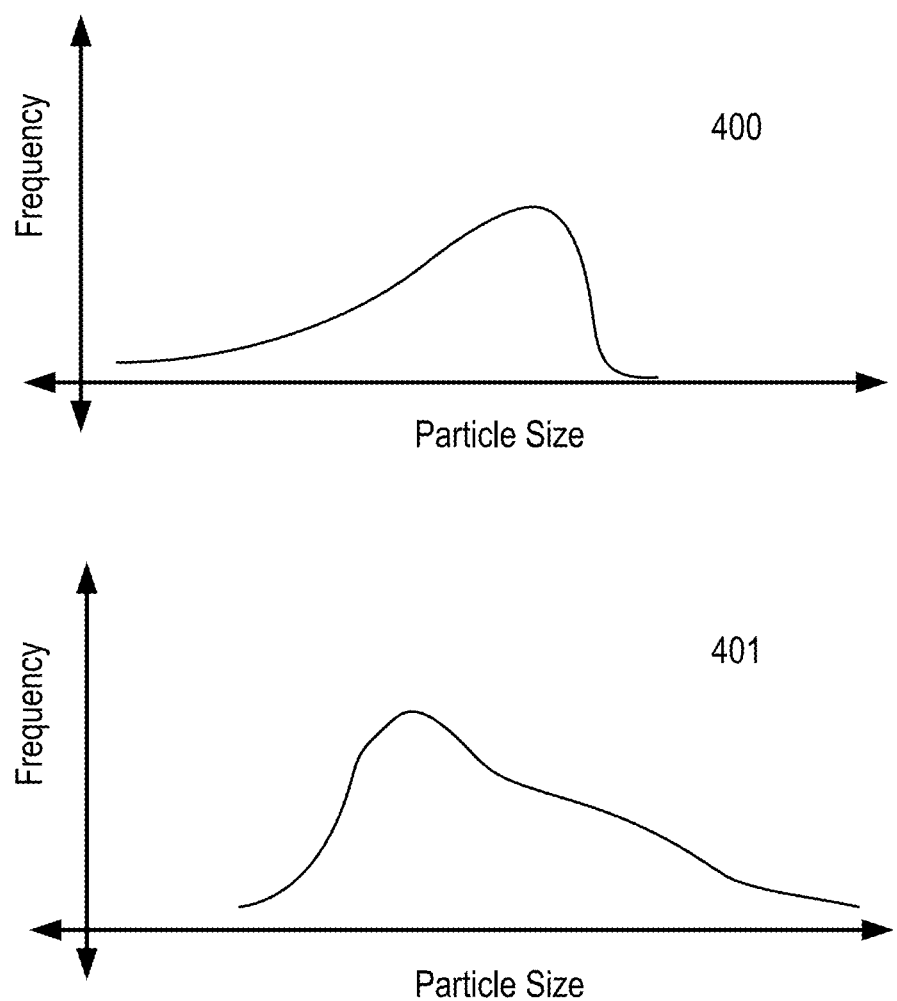
FIG. 4 shows two graphs illustrating powder size distributions.

For the characterization and quantification of powder attributes and properties, there are a multitude of available analytical methods and techniques. For example, for particle or powder size there are several aspects to the overall distribution that are important and relevant. It is insufficient to simply quantify the average particle size, or even the mean and mode are insufficient to fully characterize the powder size distribution. A distribution with a large fine fraction, as depicted in graph 400 of FIG. 4, can result in many particles which could prematurely vaporize at the energy densities that are optimal for the mean particle size. Alternatively, a particle distribution with a significant fraction of large particles, as depicted in graph 401, can result in such particles not fusing or melting completely at energy densities that are suitable for the average or the mean particle size.

The fraction of large and small particle are both important as they can significantly influence behavior during manufacturing. For example, a lot or batch of powder having a large fraction of fine particles in the particle size distribution can result in the fine particles vaporizing during the Additive Manufacturing process, which can create porosity due to material vaporization. At the other extreme, a lot or batch of powder having a large fraction of large particles can result in incomplete melting and fusion for the power density chosen to be optimal with respect to the average (or mean) particle size. This can result in large, irregular porosity due to incomplete fusion, or can result in unfused particles being incorporated into the final manufactured article with the corresponding interfaces between fused and unfused regions.

Figure 5:
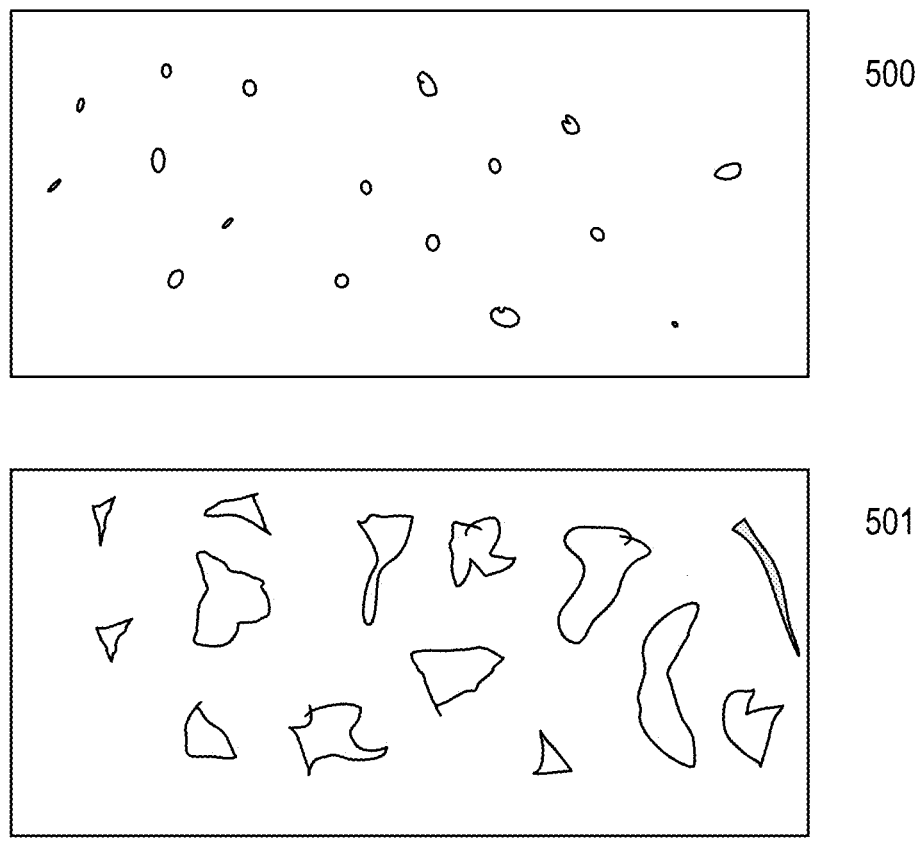
FIG. 5 shows multiple views illustrating the effects of having a concentration of powder having either too great or too small of an overall particle size.

View 500 of FIG. 5 schematically shows a possible result of using a powder having a large concentration of fine particles. This can result in a relatively smaller porosity made up of numerous substantially spherical pores. This is the result of material vaporization caused by the fine particles receiving enough energy to vaporize. View 501 shows a result of the use of a lot or batch of powder having a large fraction of large particles. As depicted, this results in relatively larger irregular porosity, which is the result of incomplete particle fusion and/or melting.

In addition to the importance of particle size, surface area of the particles plays an important role in the possibility of entrapment or entrainment of contaminants as well as the surface oxidation state of the particles. The particle morphology is another critical factor and can influence the density and packing of the particles in the powder bed prior to sintering or consolidation as part of the Additive Manufacturing process.

Figure 6:
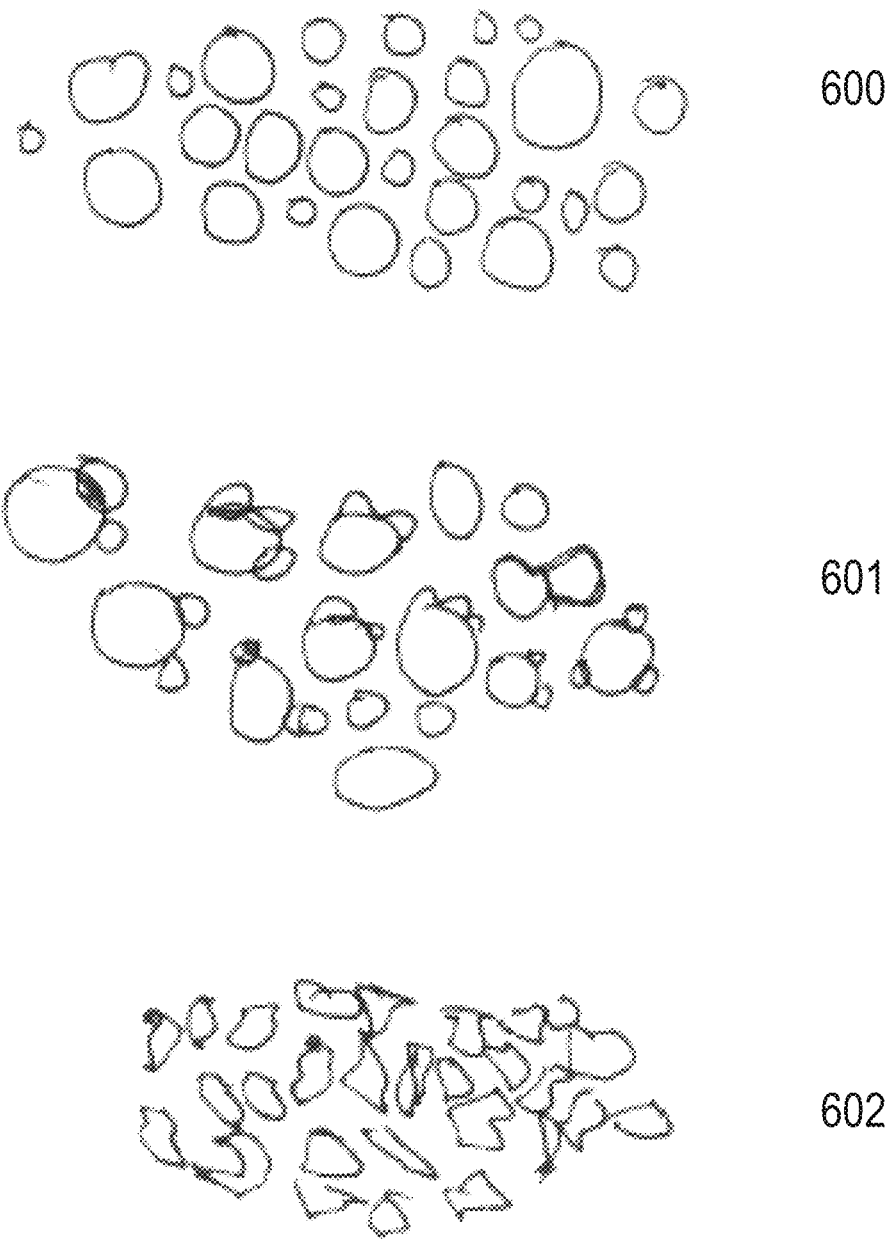
FIG. 6 shows schematically different morphologies that will result in different packing and bed density behavior

FIG. 6 shows schematically different morphologies that will result in different packing and bed density behavior. For example, if the process initially has spherical particles as depicted in view 600 with a given particle size distribution, then during the Additive Manufacturing process it is possible for particles to partially or completely agglomerate. This can happen if molten fine particles of molten material are ejected during the Additive Manufacturing process and are re-deposited onto unmelted regions of the powder bed. This can result in spherical particles with so-called satellite particles attached to them, as depicted in view 601. Both the spherical morphology 601 as well as the spherical with satellite morphology 601 will have different density and packing behavior as compared to irregular particles 602.

Figure 7:
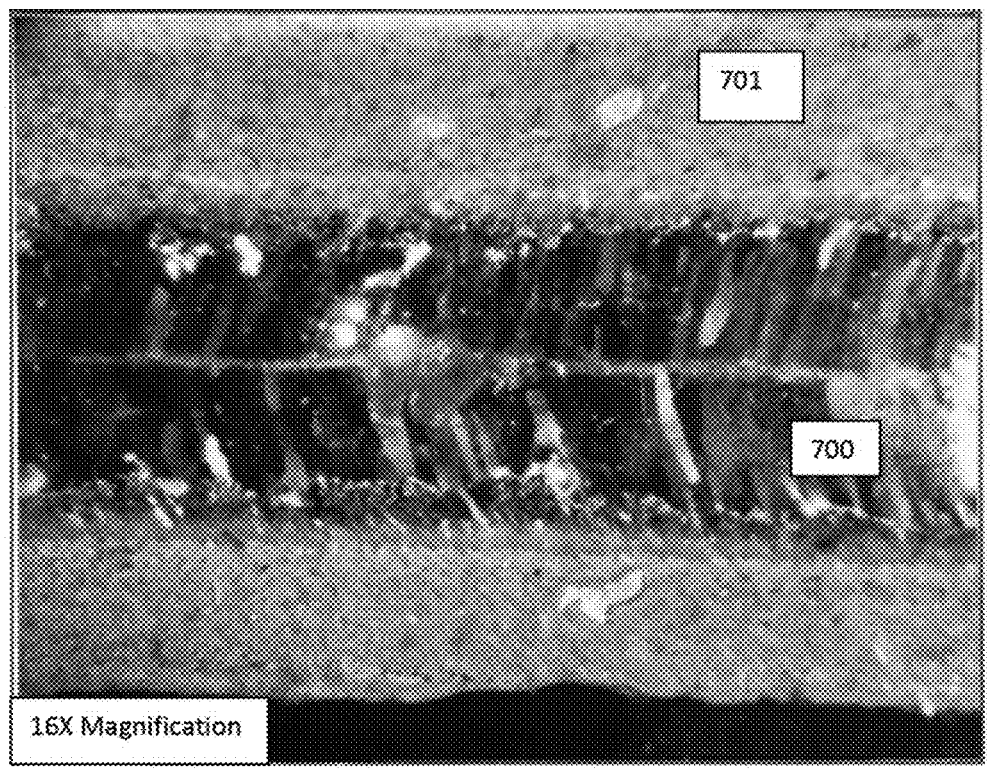
FIG. 7 shows a single molten track 700 of a nickel-based alloy on an un-melted powder bed.

Shifting away from purely particle properties and attributes, it is useful to consider the in-process physical behaviors that occur during Additive Manufacturing processes that involve sintering the powder beds using intense heat sources. The thermal conductivity of a powder bed will be significantly less than the fully dense metal. The powder bed consists of powder to powder contacts as well as interstitial gas-filled pockets with a different thermal conductivity. The effective thermal conductivity depends on many factors including particle size, particle morphology, packing density, the type of interstitial gas, etc. The powder bed conducts thermal energy through a variety of pathways which are connected in series and parallel including powder to powder contacts and gas to powder contacts. In general, the powder will have a much lower thermal conductivity as compared to the solid metal, and therefore it will tend to localize heat very effectively. FIG. 7 shows a single molten track 700 of a nickel-based alloy on an un-melted powder bed 701. The melt track is highly localized and does not have a significant heat affected zone.

Figure 8:
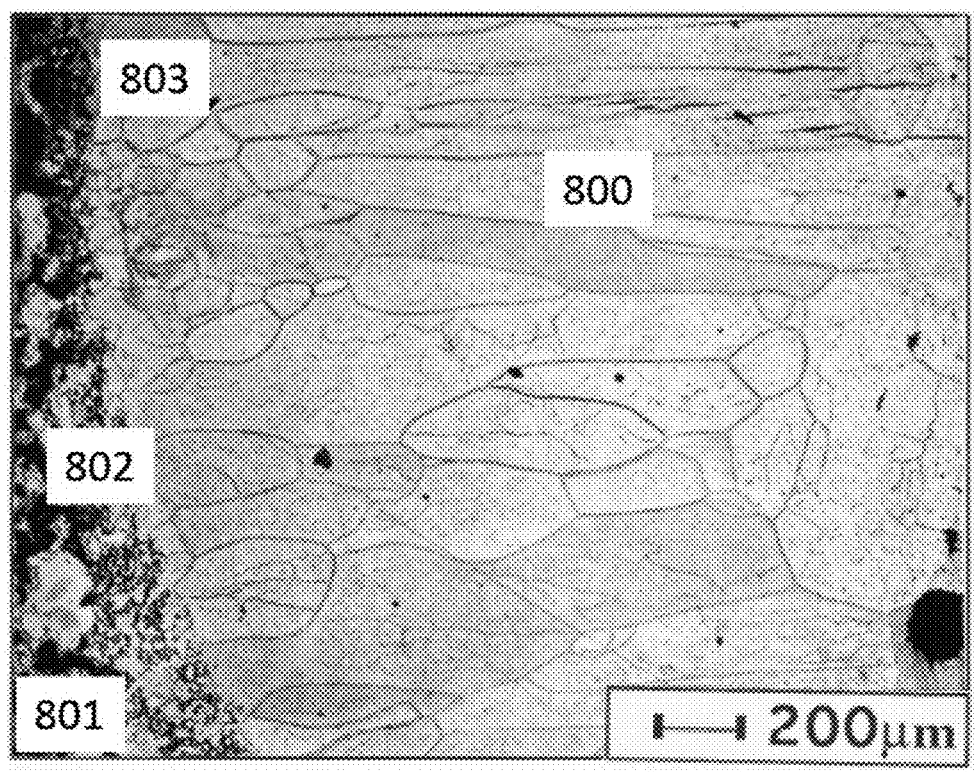
FIG. 8 shows a close up of the interface between the melt track and the unmelted powders indicating a fairly sharp boundary.

FIG. 8 shows a close up of the interface between the melt track and the unmelted powders indicating a fairly sharp boundary, which in turn implies the presence of sharp thermal gradients. FIG. 8 also shows the presence of a columnar microstructure 800 in the middle of the track indicating solidification in the presence of a strong directional thermal gradient. The unmelted zone 801 consists of unmelted powders and is fairly sharp due to the low thermal conductivity of the powder bed as compared to the molten liquid or solidified melt track. There is however a small thermally affected zone 802 in the powder bed immediately adjacent to the melt track. This consists of partially melted powders, or regions where the liquid from the melt track has infiltrated the powder bed through surface tension driven flow, i.e. wetting. Finally, there is evidence of a finer grained chill zone 803 near the boundary between the melt track and the powder bed. This is a region characterized by small, equiaxed grains as opposed to the large columnar grains that dominate most of the microstructure of the melt zone. It is possible that these grains have multiple orientations, but then preferred orientations grow in a columnar fashion into the melt region from the boundary.

The powder bed conductivity is generally an unknown material property that is difficult to measure directly. However to establish the equivalence of two different powder lots or batches, it is important to verify that their thermal conductivity properties are equivalent. More generally, the thermophysical properties of density, heat capacity and thermal conductivity must be equivalent. As previously mentioned, thermal conductivity in a packed powder bed with interstitial gas is a complex phenomenon.

Figure 9:
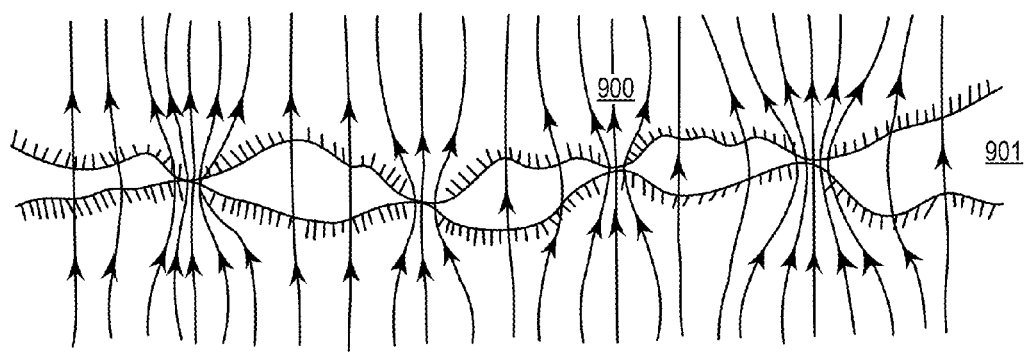
FIG. 9 shows a highly magnified schematic view showing the microscopic geometry of contact between particles of a powder.

FIG. 9 shows a highly magnified schematic view showing the microscopic geometry of a powder contact. At regions of microscopic solid to solid contact 900, the lines of heat flux are compressed and flow through the geometric constrictions posed by the microscopic contacts. At other regions where there is no solid to solid contact 901, heat is transferred through the interstitial gas pockets. Over the very small distances that characterize such interstitial spaces, the primary mechanism of such heat transfer will be conduction.

As the powder conductivity is an unknown, but the heat input conditions and the thermal boundary conditions are otherwise known or can be specified, this represents a type of inverse problem in which there are unknown material parameters that are calculated or otherwise inferred from given boundary conditions and measurements regarding the thermal field. This type of problem can also be viewed as an optimization problem in which the material parameters are unknown quantities to be determined through an optimization routine.

Figure 10:
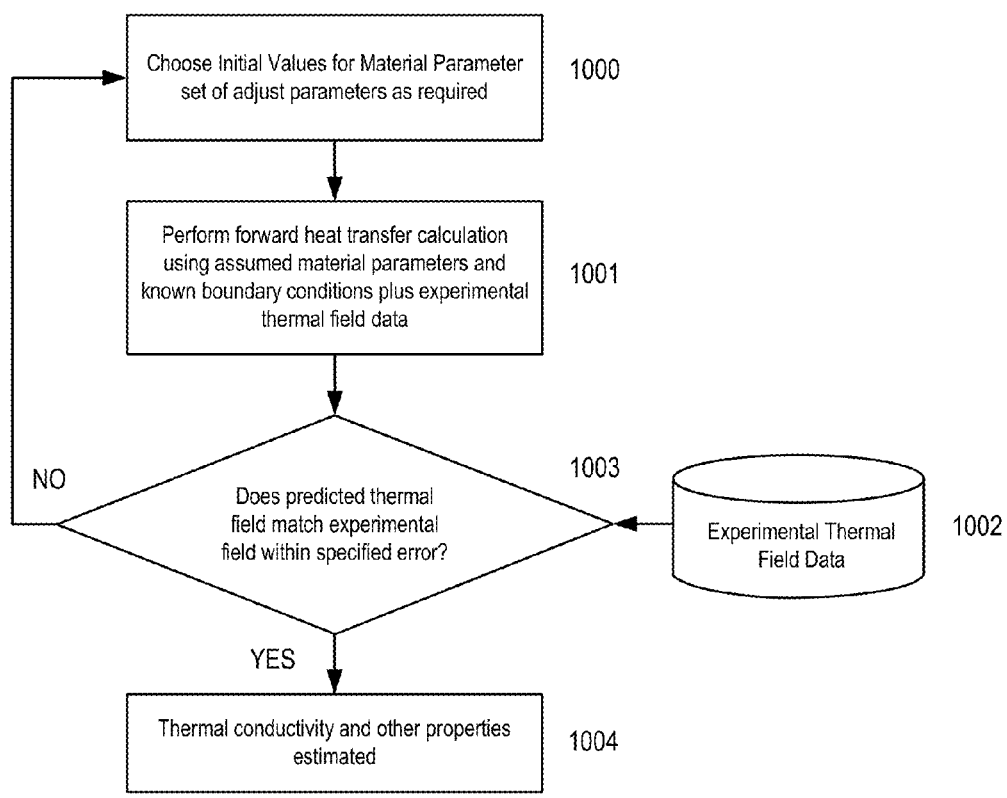
FIG. 10 shows an exemplary block diagram illustrating one possible optimization routine.

FIG. 10 shows an exemplary block diagram illustrating one possible optimization routine. At 1000, material parameters such as thermal conductivity are chosen initially or are iterated as required in the optimization loop. At 1001, the forward thermal heat transfer problem is solved using the known boundary conditions, known heat input, and assumed thermal properties for the powder bed. At 1002, experimental thermal field data is gathered. The data can be gathered in many ways, including by one or more of the following: by real-time measurements occurring during the manufacturing process; through examination of microstructure after the manufacturing process is complete; at some intermediate state of the manufacturing process; and by examining a specially designed test coupon for this purpose. At 1003, the comparison is made between the predicted thermal values based on the assumed material properties and the known heat input and boundary conditions in the one hand and the experimental thermal field data on the other hand. When the results of the predicted thermal field match the experimentally measured thermal field within a specified error, then at 1004 we have a completed prediction of the thermal properties based on this optimization routine. Otherwise the process reverts back to 1000 and a new set of assumed properties is chosen, and the optimization loop repeats.

FIG. 11 outlines several possible ways of obtaining experimentally determined thermal field data. Generally it can be obtained using real time data from the manufacturing process itself or from post-process metallurgical or metallographic data. The table depicted in FIG. 11 outlines several possible measurements for each category that can be made to obtain such data.

Figure 12:
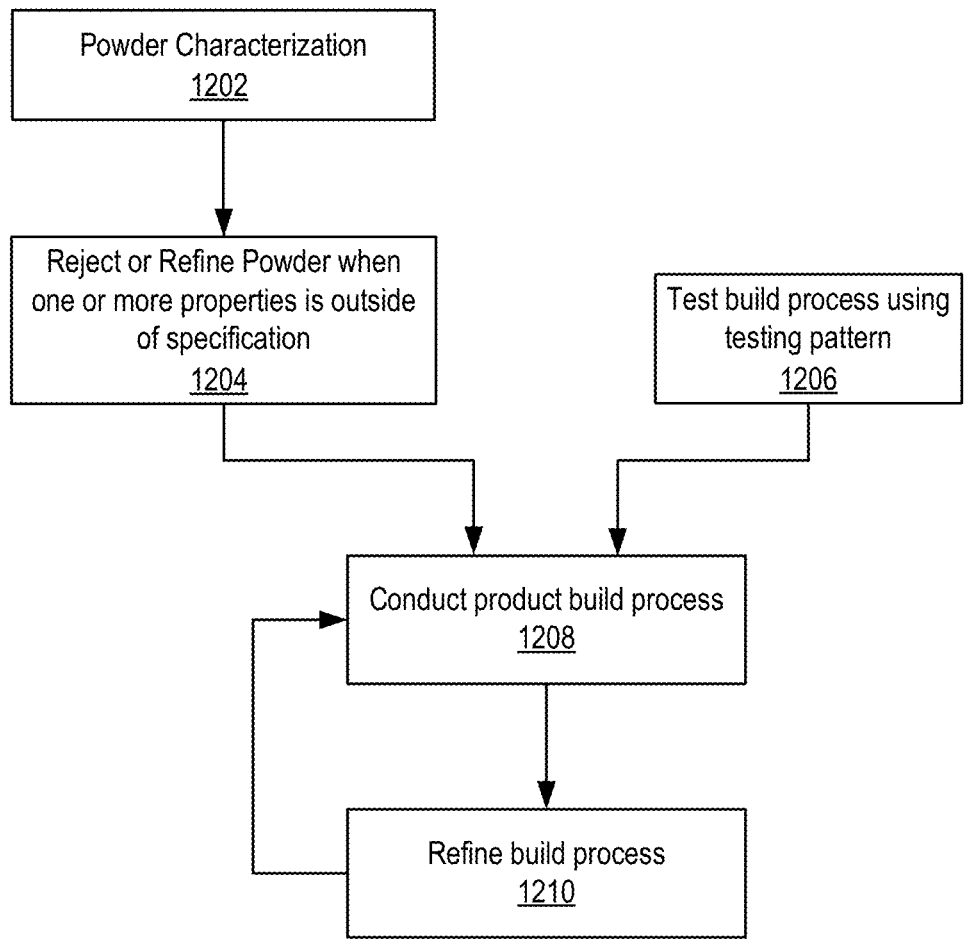
FIG. 12 shows a block diagram illustrating a method for characterizing and optimizing machine parameters for use with a new lot or batch of powder.

FIG. 12 shows a block diagram illustrating a method for characterizing and optimizing machine parameters for use with a new lot or batch of powder. At 1202 the new lot or batch of powder is analyzed. Various well known methods of analysis can be used to determine characteristics of the batch of powder such as purity, the particle composition, particle size and particle shape. At 1204, after characterizing the powder to identify any property variations, a material characterization processor can be configured to determine whether the measured characteristics fall within tolerances for the additive manufacturing machine and/or process. When one or more parameters are outside of or exceed a predefined threshold the lot or batch can be returned to the manufacturer or undergo additional processing to achieve acceptable values for the parameters exceeding the predefined thresholds. For example, the powder could be sifted through a series of screens configured to remove particles having sizes that exceed and/or fall below a predefined particle size range. At 1206, a test pattern can be produced using the new lot or batch and a standardized parameter set. Sensor data captured while producing the part can be compared to sensor data captured while producing the same part with a known-good batch of powder using the same standardized parameter set. By comparing the sensor data certain properties and characteristics can be inferred with regards to the new lot or batch of powder. At 1208, production runs can begin. In some embodiments, adjustments to the powder composition and/or measurements taken during the test build process can be used to optimize parameter settings when beginning to conduct product build processes. In some embodiments, these previous sets of testing and analysis steps can be sufficient to achieve a successful build process. In some embodiments, sensors data captured during the production build process can be compared with sensor data collected during previous known good processing runs. These measurements can be used to adjust parameters such as laser power or scan pattern to arrive at a satisfactory build process. In some embodiments, a controller responsible for carrying out the build process can adjust the power settings during the build process to adjust for conditions departing from. At 1210, the build process is refined. The refining can take the form of comparing sensor data recorded during the build process with post-process dissection of the finished part, to identify any potential flaws in the build process occurring as a result of the new batch or lot of powder. In this way, an ideal or at least functional solution can be determined. Control over the process during the build process or in real-time is described in greater detail in application Ser. No. 14/945,249, entitled "Multi-Sensor Quality Inference and Control for Additive Manufacturing Processes," which is incorporated by reference in its entirety and for all purposes.

Figure 13:
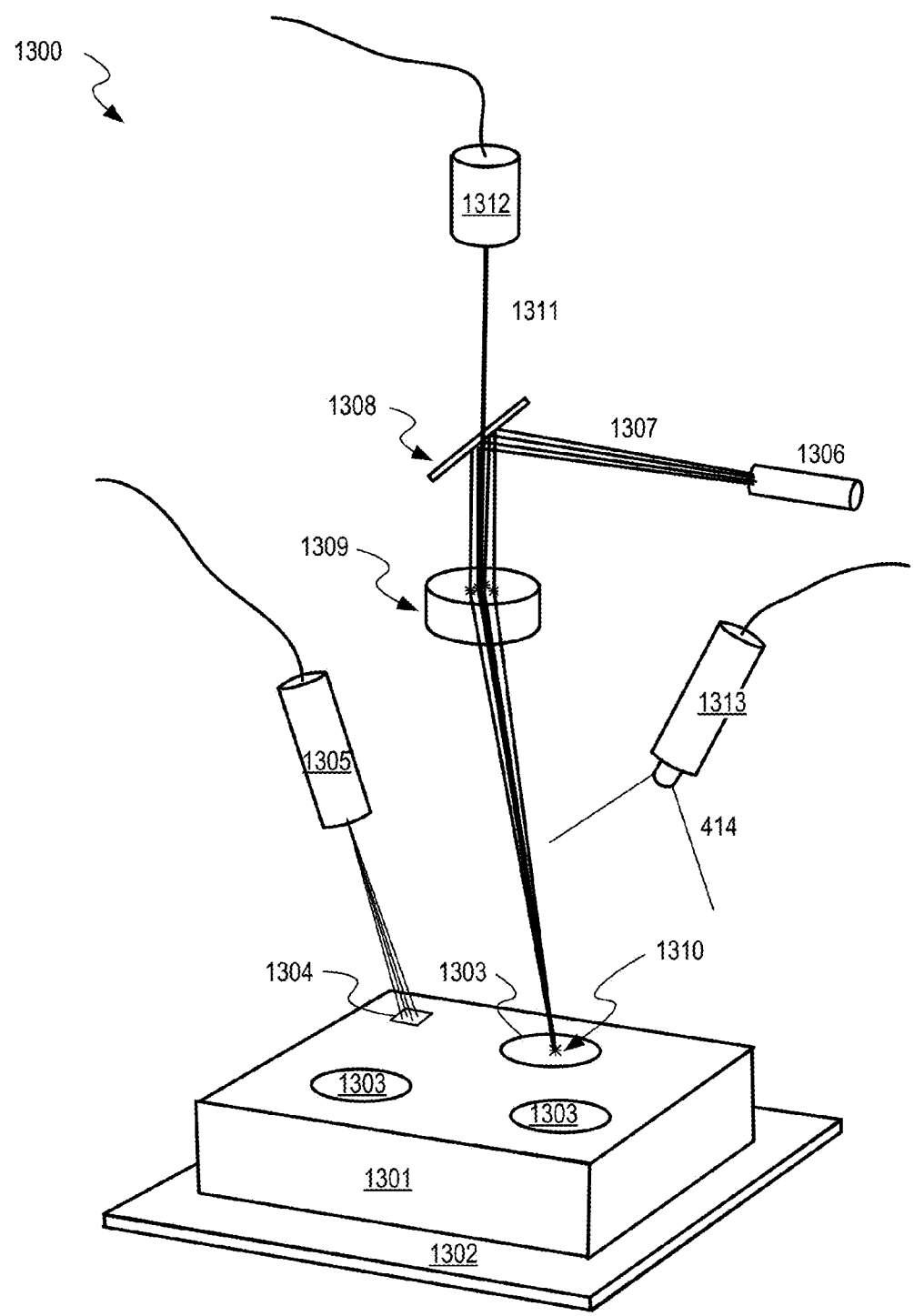
FIG. 13 shows exemplary additive manufacturing equipment that includes sensors for monitoring additive manufacturing operations.
Figure 14A:
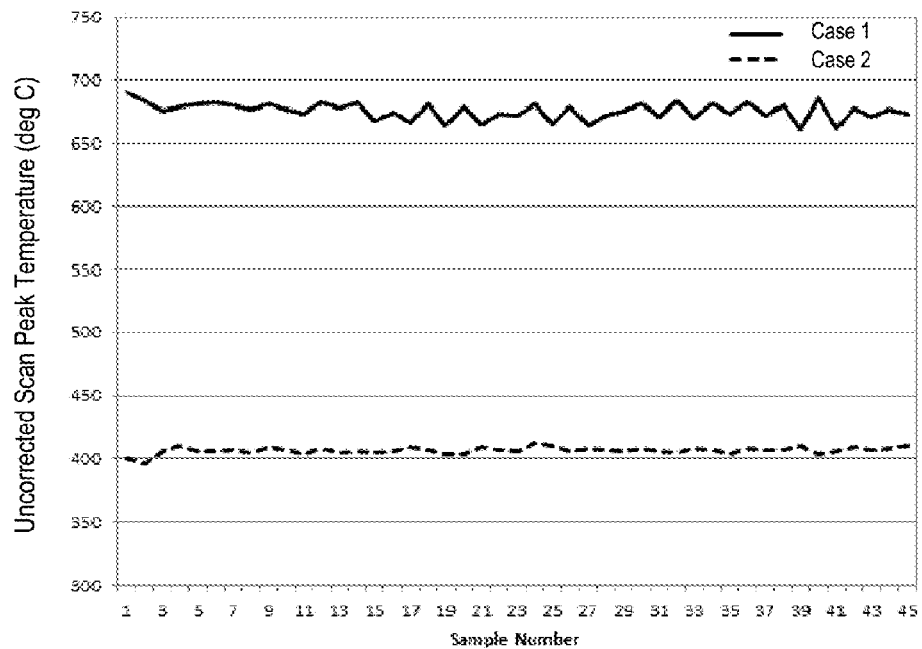
FIGS. 14A-14F show a series of graphs depicting various bulk and scan level quality metrics.
Figure 14B:
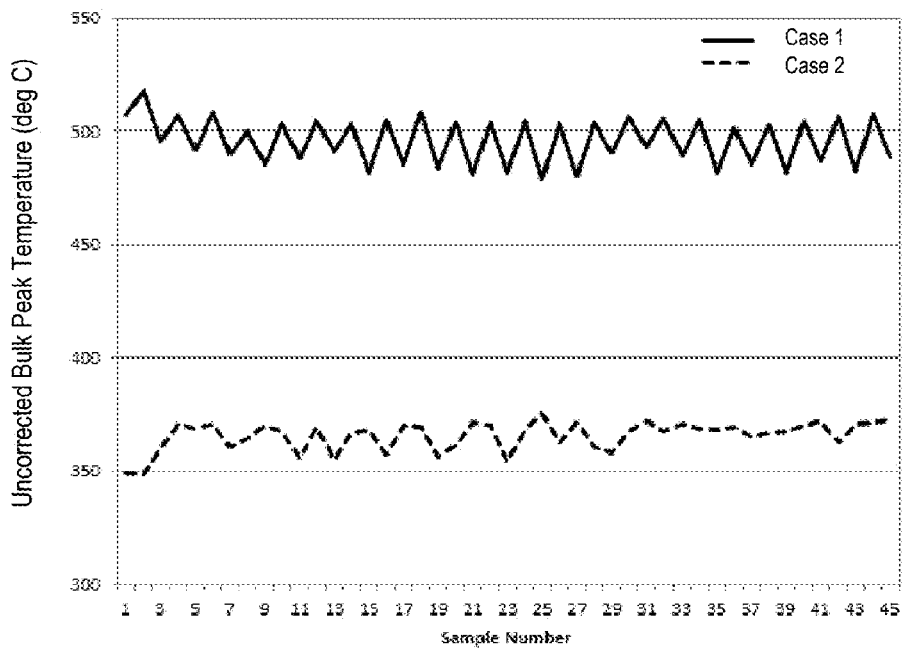
Figure 14C:
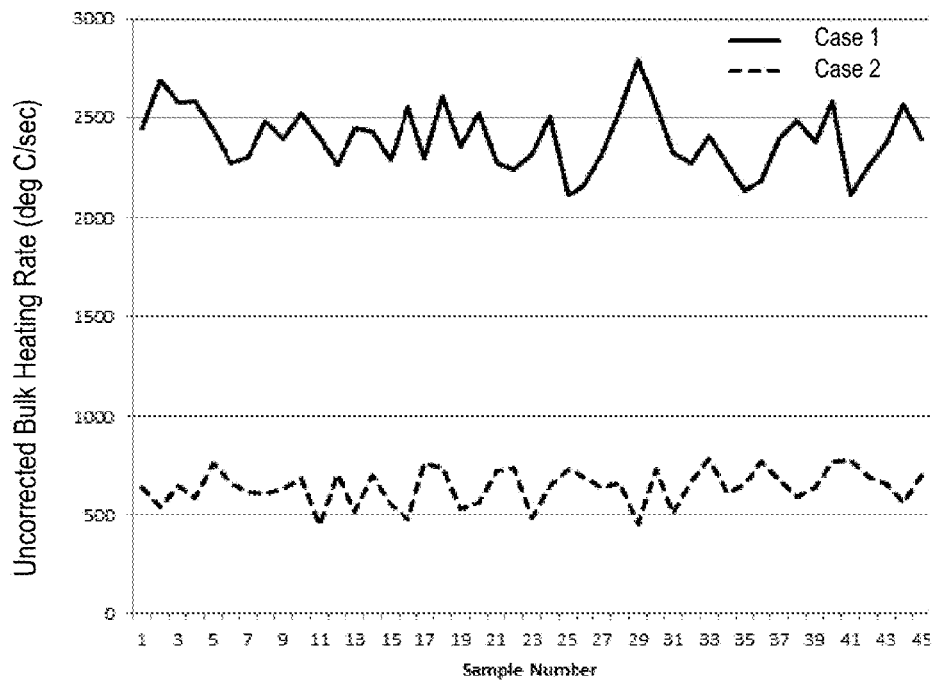
Figure 14D:
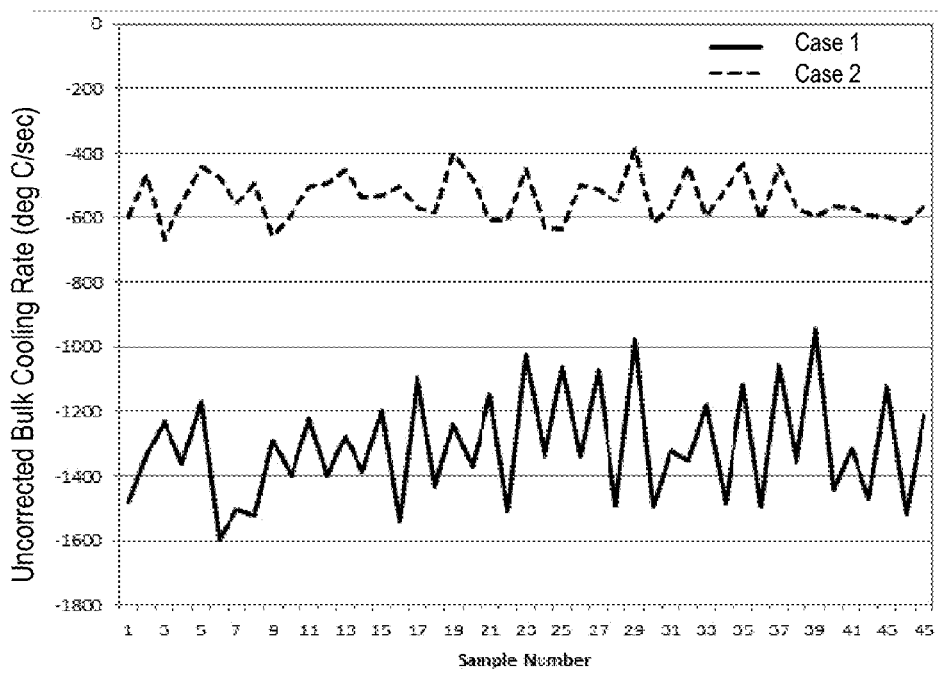
Figure 14E:
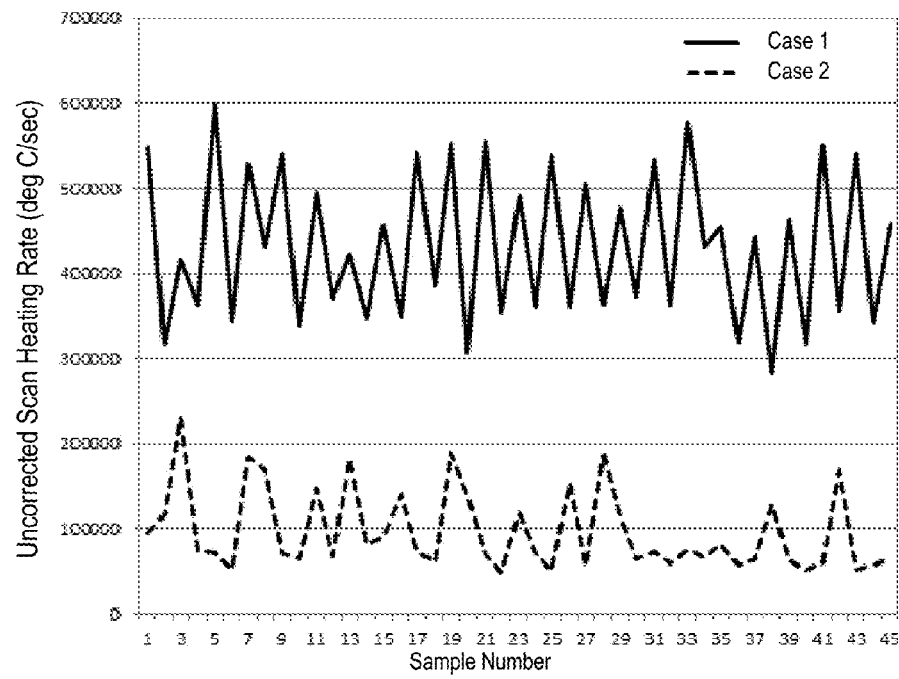
Figure 14F:
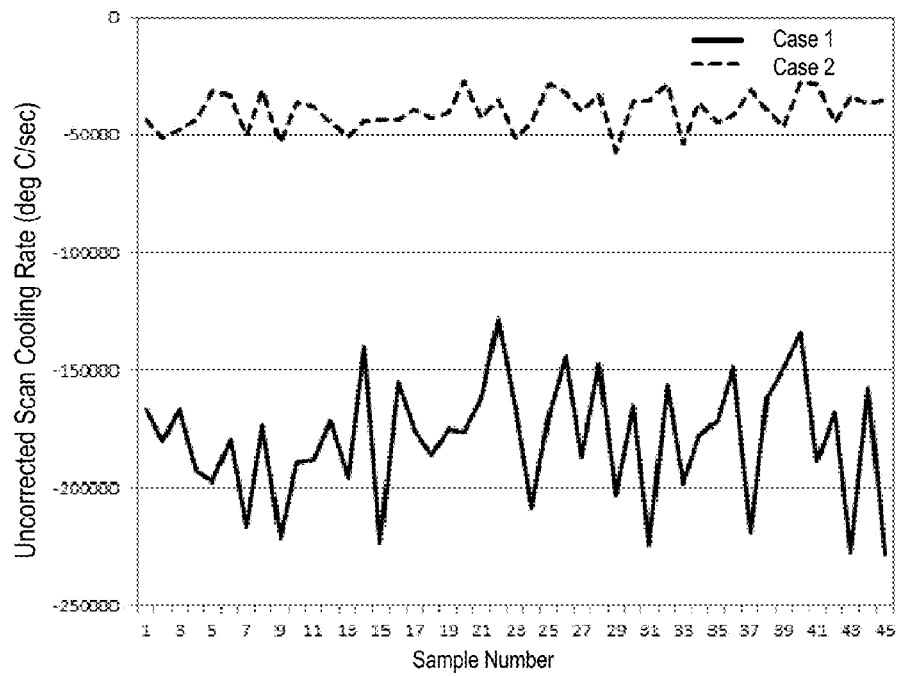

FIG. 13 shows exemplary additive manufacturing equipment. In particular FIG. 13 illustrates additive manufacturing equipment and a quality control system 1300 suitable for use with at least some of the previously described embodiments. The quality control system 1300 can be utilized in conjunction with Additive Manufacturing processes in which the moving heat source is a laser and the material addition could be either through the sequential pre-placement of layers of metal powders to form a volume of powder 1301, as depicted, on a powder bed 1302, or the material addition could be accomplished by selectively placing powder straight into the molten region generated by the moving laser on the part. In embodiments, where powder is added in layers, a particle spreader (not depicted) can be configured to deposit thin and uniform layers of powder on powder bed 1302. The volume of powder 1301 has several distinct build regions 1303, which are being built up. In the case of the depicted embodiment, the buildup is accomplished by the application of the heat source to the material build regions 1303, which causes the deposited powder in those regions to melt and subsequently solidify into a part having a desired geometry. The various regions 1303 could be different portions of the same part, or they could represent three entirely different parts, as depicted.

As illustrated in FIG. 13, a witness coupon 1304 is provided. Witness coupon 1304 is a standardized volume element, which allows the sampling of every production build and which represents a small and manageable but still representative amount of material which could be destructively tested for metallurgical integrity, physical properties, and mechanical properties. For every layer that is put down, the witness coupon 1304 also has a layer of material put down concurrent to the layer being processed in the distinct build regions 1303. There is an optical sensor 1305, for example a pyrometer, directly interrogating the witness coupon 1304. For purposes of clarity, optical sensor 1305 is represented as a pyrometer herein although it will be evident to one of skill in the art that other optical sensors could be utilized as part of a larger optical sensing system. The pyrometer 1305 is fixed with respect to the powder bed 1302 and collects radiation from a fixed portion of the volume of powder 1301, i.e., the witness coupon 1304. The radiation observed by pyrometer 1305 can be subsequently stored as sensor readings in a computer readable storage medium for real-time or post-process analysis. The sensor readings can be processed by a controller or processor associated with quality control system 1300. In some embodiments, computer readable storage medium can take the form of a device hard drive capable of storing sensor data from many different additive manufacturing operations.

In the instance where the Additive Manufacturing process includes a scanning laser impinging on powder bed 1302, the laser source 1306 emits a laser beam 1307 that is deflected by a partially reflective mirror 1308. Partially reflective mirror 1308 can be configured to reflect only those wavelengths of light that are associated with wavelengths of laser beam 1307, while allowing other wavelengths of light to pass through partially reflective mirror 1308. After being deflected by mirror 1308, laser beam 1307 enters scan head 1309. Scan head 1309 can include internal x-deflection, y-deflection, and focusing optics. The deflected and focused laser beam 1307 exits the scan head 1309 and forms a small, hot, travelling melt pool 1310 in the distinct build regions 1303 being melted or sintered layer by layer. Scan head 1309 can be configured to maneuver laser beam 1307 across a surface of the volume of powder 1301 at high speeds. It should be noted that in some embodiments, laser beam 407 can be activated and deactivated at specific intervals to avoid heating portions of the volume of powder 1301 across which scan head 1309 would otherwise scan laser beam 1307.

Melt pool 1310 emits optical radiation 1311 that travels back through scan head 1309 and passes through partially reflective mirror 1308 to be collected by optical sensor 1312. The optical sensor 1312 collects optical radiation from the travelling melt pool 1310 and therefore, images different portions of the volume of powder 1301 as the melt pool 1310 traverses the volume of powder. A sampling rate of optical sensor 1312 will generally dictate how many data points can be recorded as melt pool 1310 scans across the volume of powder 1301. The optical sensor 1312 can take many forms including that of a photodiode, an infrared camera, a CCD array, a spectrometer, or any other optically sensitive measurement system. In addition to pyrometer 405 and optical sensor 412, quality control system 1300 can also include optical sensor 1313. Optical sensor 1313 can be configured to receive optical information across a wide field of view 1314 so that real time monitoring of substantially all of the volume of powder 1301 can be realized. As with optical sensor 1312, optical sensor 1313 can take many forms including that of a photodiode, an infrared camera, a CCD array, and the like. By adding optical sensor 1313 to quality control system 1300, which continuously monitors all of the volume of powder 1301, quality control system 1300 gains an additional set of sensor data for any point on the volume of powder 401. In configurations where optical sensor 1313 is setup to distinguish relative amounts of emitted heat, readings from pyrometer 1305 can be used to calibrate optical sensor 1313 so that heat readings across the entire surface of the volume of powder 1301 can be continuously recorded and analyzed for irregularities. Additionally, quantitative temperature information can be measured at all locations of the volume of powder 1301 using optical sensor 1313. This quality assurance system 1300 can be used with any of the described embodiments disclosed herein.

Exemplary Particle Studies:
Particle Size and Layer Thickness Study

In one study, two runs were conducted using identical beam parameters with the following variations in powder particle properties and layer thickness. In case 1, a powder having a 25 micron mean particle size diameter (PSD) was applied by a particle spreader in 20 micron layers. In case 2, a powder having a 50 micron PSD was applied by a particle spreader in 40 micron layers. The material in both cases was IN718+, which is a nickel-based super.

FIGS. 14A-14F show a series of graphs depicting various bulk and scan level quality metrics. Bulk quality metrics represents sensor readings taken while a heat source is not in the field of view of the sensor, while scan level quality metrics refer to sensor reading taken while the heat source is passing through the field of view of the sensor (e.g. readings taken within the witness coupon region depicted in FIG. 13). The specific quality metrics chosen for both bulk and scan level response are peak temperature (PT), heating rate (FIR), and cooling rate (CR). These are representative quality metrics and not by any means the only possible quality metrics which could elucidate the differences shown herein. The various quality metrics shown herein are uncorrected, which means that they have not been calibrated to an absolute thermal measurement and therefore represent a relative measure of each of the quantities discussed (i.e. PT, HR, and CR). Factors which make these measurements relative as opposed to absolute include: emissivity variations, phase transitions from solid to liquid and vice versa, field of view correction factors, and correction factors based on the range of spectral wavelengths over which the sensors are gather data. Despite the fact that these are relative measurements, they show a clear difference between CASE 1 and CASE 2, and this difference will only be more accurately represented when the various correction and scaling factors are applied.

Variation of a Single Parameter

Now consider the case when only the particle size distribution or the layer thickness is changed, but not both at the same time. In both batches of powder, the alloy was IN718 and the chemistries were nominally identical. The particle size distribution differences are shown in Table 1 below.

TABLE 1

| Smaller Sized Particle Size Distribution | | Larger Sized Particle Size Distribution | |
| --- | --- | --- | --- |
| D10 | 27.9 microns | D10 | 18.9 microns |
| D50 | 39.4 microns | D50 | 31.2 microns |
| D90 | 57.8 microns | D90 | 47.2 microns |

D10, D50, and D90 mean that 10%, 50%, and 90% of the particles in the particle size distribution are less than or equal to the corresponding particle size in microns. Therefore they could be viewed as the $10^{th}$, $50^{th}$, and $90^{th}$ percentile numbers for the particle size distribution. Furthermore for each type of powder used, the layer thicknesses were adjusted to 40 microns and 50 microns. Identical sets of process parameters were then run on each batch of powder.

Variation of Layer Thickness

Figure 15A:
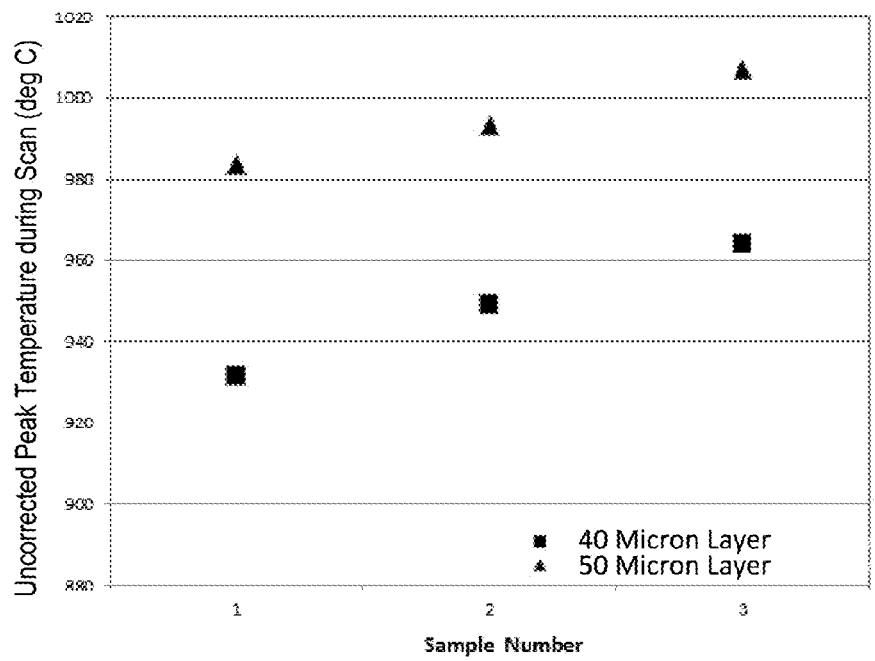
FIGS. 15A-15F clearly depict that the peak temperature is higher, the heating rate is lower, and the cooling rate is less negative (slower cooling) for the 50 micron layer as compared to the 40 micron layer.
Figure 15B:
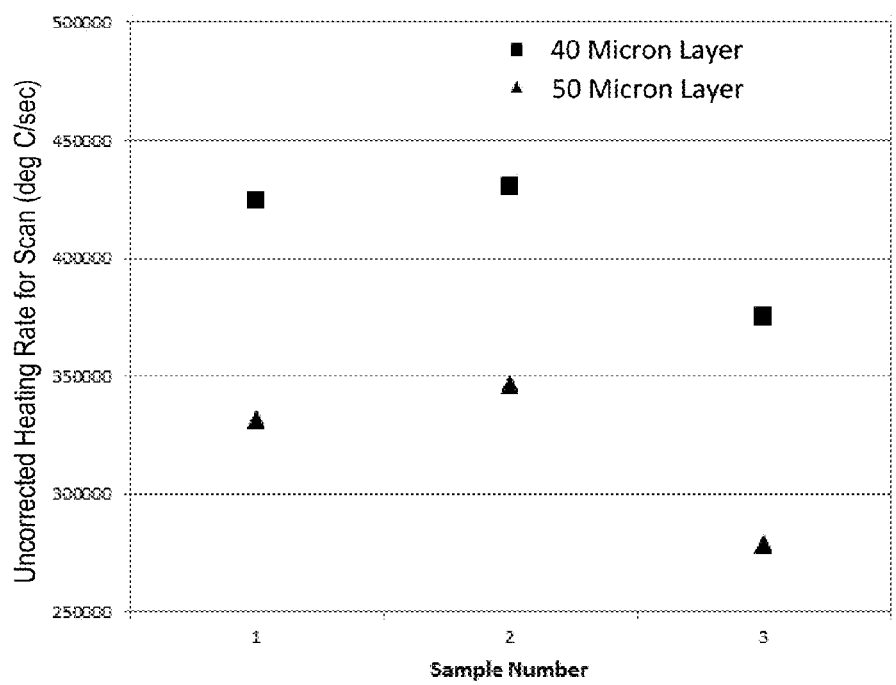
Figure 15C:
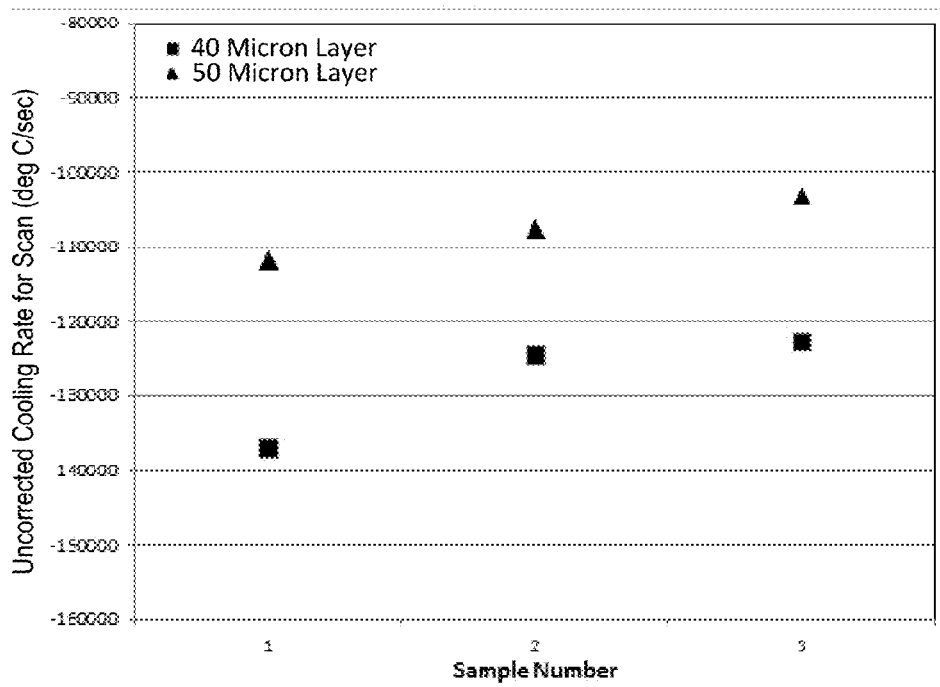
Figure 15D:
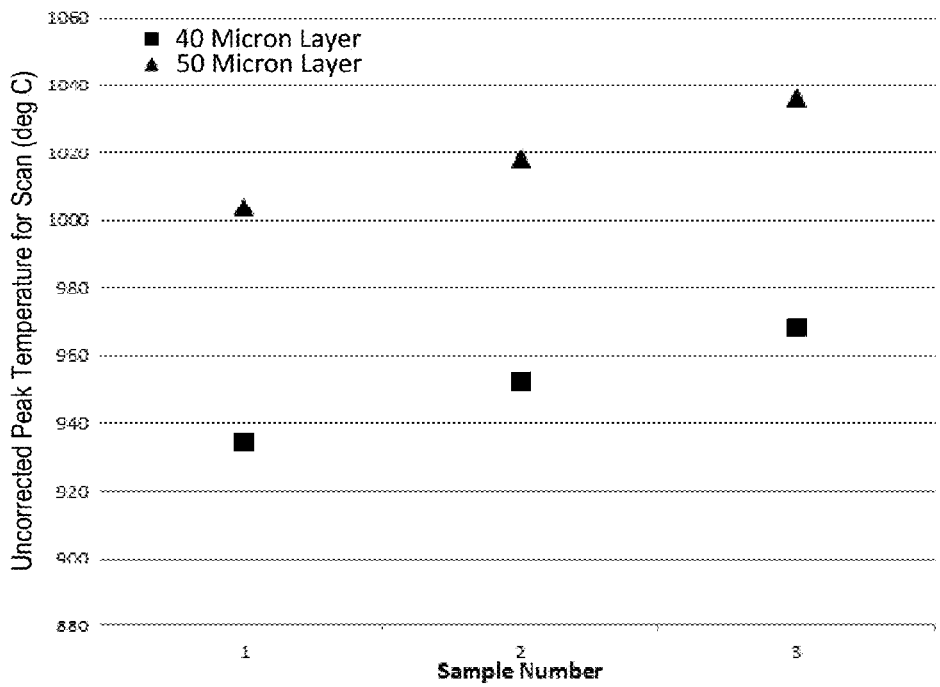
Figure 15E:
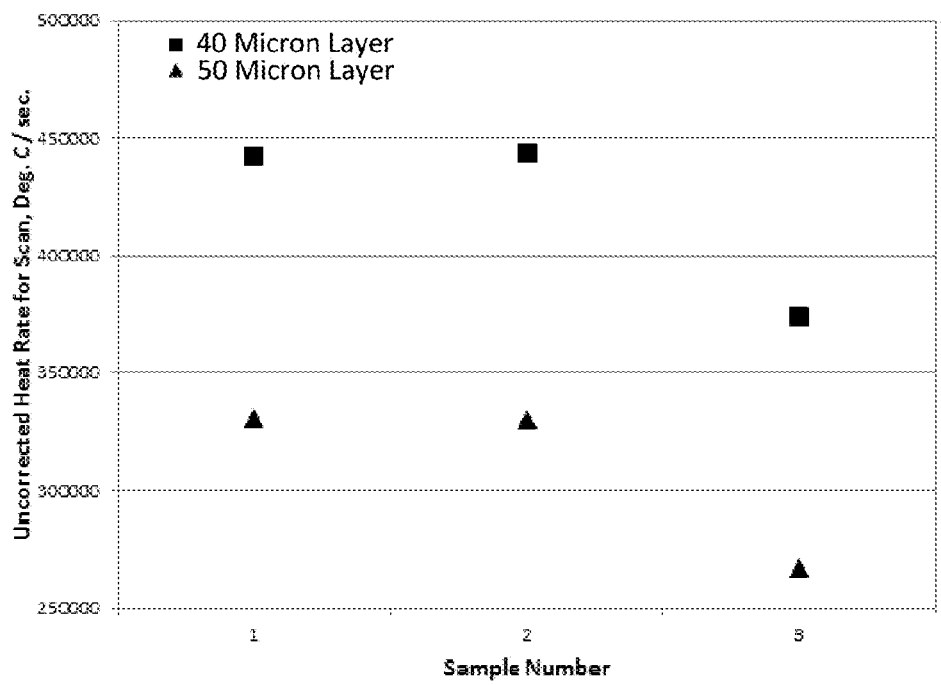
Figure 15F:
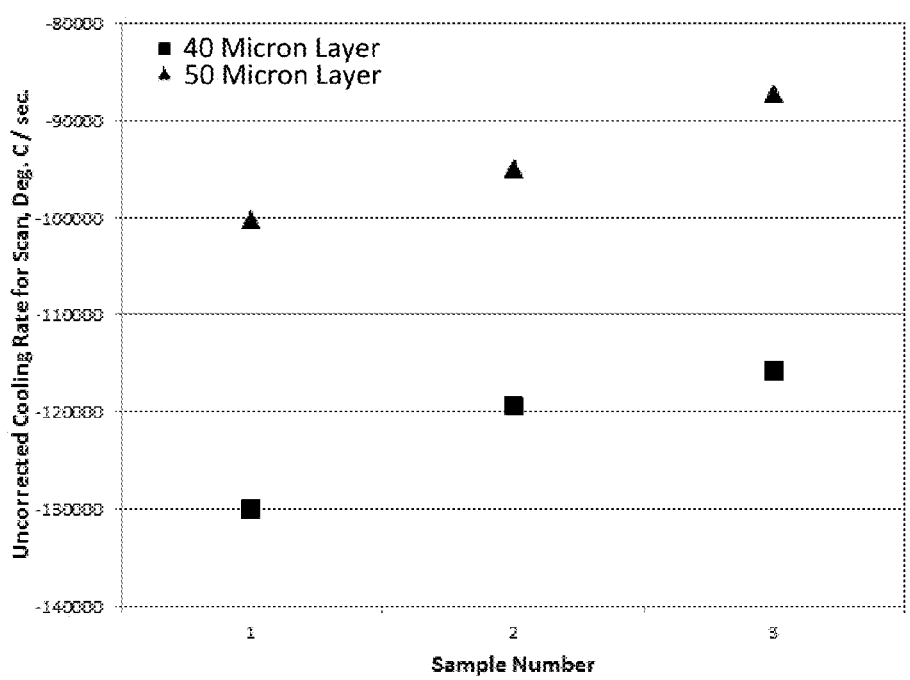

Consider first the case of independently changing the layer thickness, i.e. 40 micron vs. 50 micron. This is not expected to have a big effect on the so-called bulk quality metrics that track the thermal field evolution on larger time scales and over large distances, because these are dominated by thermal diffusion. However the scan level features such as scan level peak temperature (see FIG. 15A), scan level heating rate (see FIG. 15B), and scan level cooling rate (see FIG. 15C) are expected to be different as a variation in layer thickness will have a large impact on local and short time thermal conditions right near the travelling heat source.

For example looking at the powder with the larger particle size distribution, the difference in layer thickness on three representative scan level features is shown in FIGS. 15A-15F. In these charts three different samples were taken with 100 layers each. The mean values for each sample are shown in the graphs. The temperatures were uncorrected, i.e. they were simply converted from a raw pyrometer/thermal sensor signal, so the measurements are not corrected to compensate for factors such as emissivity variations, phase change, field of view, etc. The differences when the data is scaled are not expected to change as the scaling is either linear or monotonically increasing in terms of their effect on the raw data signals, i.e. simple scaling/offset.

FIGS. 15A-15F clearly depict that the peak temperature is higher, the heating rate is lower, and the cooling rate is less negative (slower cooling) for the 50 micron layer as compared to the 40 micron layer. This is to be expected, since the thicker layer means a longer heat conduction length and hence a high peak temperature (longer distance for heat to travel to heat sink). Similarly the greater amount of material being melted means that the thicker layer will have a slower heating rate for a given set of beam power and travel speed conditions. Similarly, as there is more material and greater heat that must be dissipated, it makes sense that the cooling rate should be less negative, i.e. the cooling is slower for the thicker material layer. It is interesting to note that the same trend holds for the smaller particle size distribution. The samples here too are samples of 100 layers respectively.

Variation of Particle Size

Figure 16A:
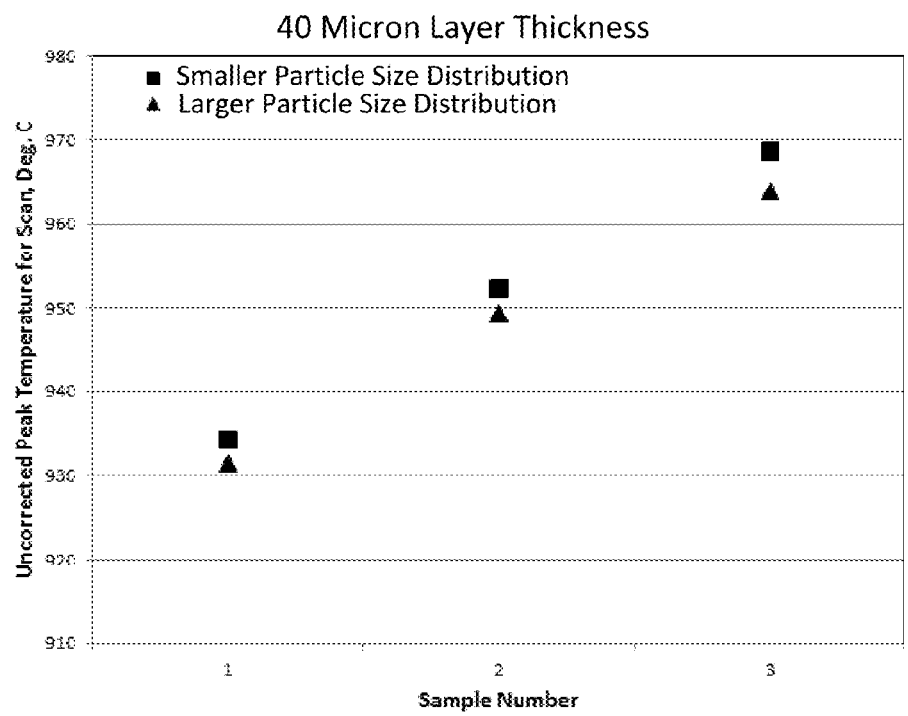
FIGS. 16A-16B show charts depicting sensor readings of peak temperature for multiple additive machining operations using powders having different particle size distributions.
Figure 16B:
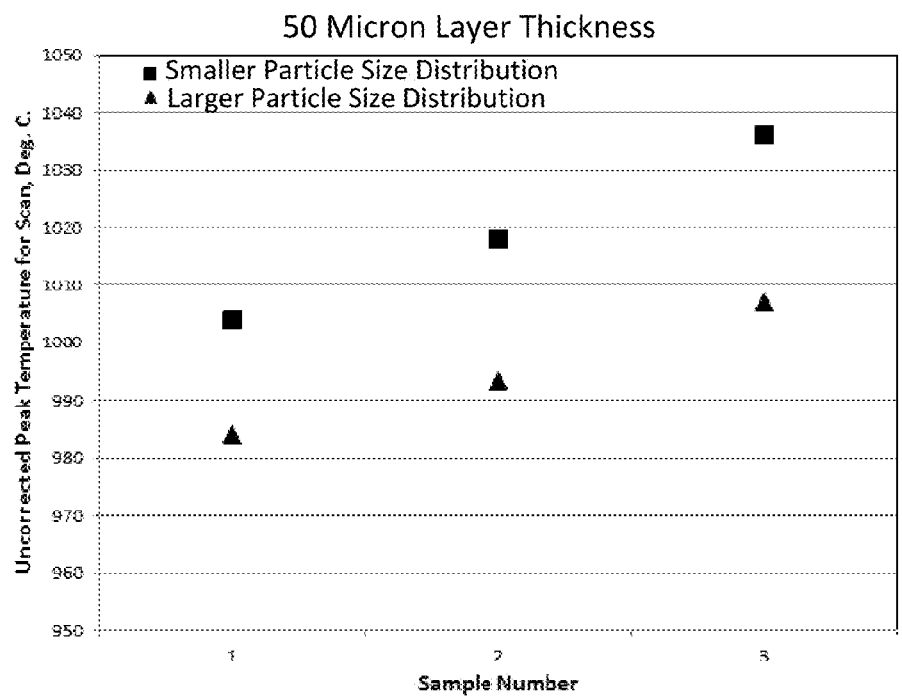

Now it is instructive to see differences caused by performing a process multiple times, changing only the particle size. This is shown in FIGS. 16A-16B, which depict sensor readings of a sensitive feature, peak temperature. For smaller powders, we expect tighter packing, and as the distribution of fine particle is great, we expect there to be higher temperatures as some of these smaller particles will melt more quickly and will have a greater superheating temperature for a given beam power and a given travel speed. Also, we expect the effect to be greater for a 50 micron layer thickness as compared to a 40 micron layer thickness because of the greater distance that heat must travel before it can be dissipated through thermal diffusion. Both of these trends are borne out in the data as shown in FIGS. 16A and 16B.

Other Variations

It should be noted at this time that detectable variations are not limited to variations in layer thickness and particle size. For example, a heavily oxidized powder could reduce thermal conductivity on account of the oxidized materials being poor conductors of heat. One could expect generally higher peak temperatures on account of the part under production being unable to spread and dissipate heat received during the build process. Another powder characteristic that can be detected by the described thermal measurement systems is the presence of contaminates within the powder. In particular, by taking a measurement of the size of the weld pool generated by the laser using a vision system and combining that with natural frequency measurements taken by a photodiode configured to take on-axis measurements of the weld pool, surface tension of the melted metal can be determined. Variations in surface tension can then be mapped to contamination of the powder. In some embodiments, changes in surface tension could give indication of the presence of contaminates within the powder down to the parts per million level. Measurement of surface tension in this manner is described in more detail in application Ser. No. 14/945,249, entitled "Multi-Sensor Quality Inference and Control for Additive Manufacturing Processes." Another powder characteristic that can be detected is variations in the alloy composition. By measuring the on-heating liquidus temperature of the powder (i.e. melting temperature) of the powder using calibrated temperature data collected by a thermographic sensor, any variation of the melting temperature from the known standard melting temperature for that alloy composition can be a strong indicator of a variation in the alloy composition. In some embodiments, common variations can be quickly identified by referencing a chart characterizing likely effects caused by common alloy variations. Once a potential variation is identified further investigation can be performed to determine the actual composition of the alloy, which can then be used to populate the chart with additional data points.

Powder Reuse Study

Figure 17:
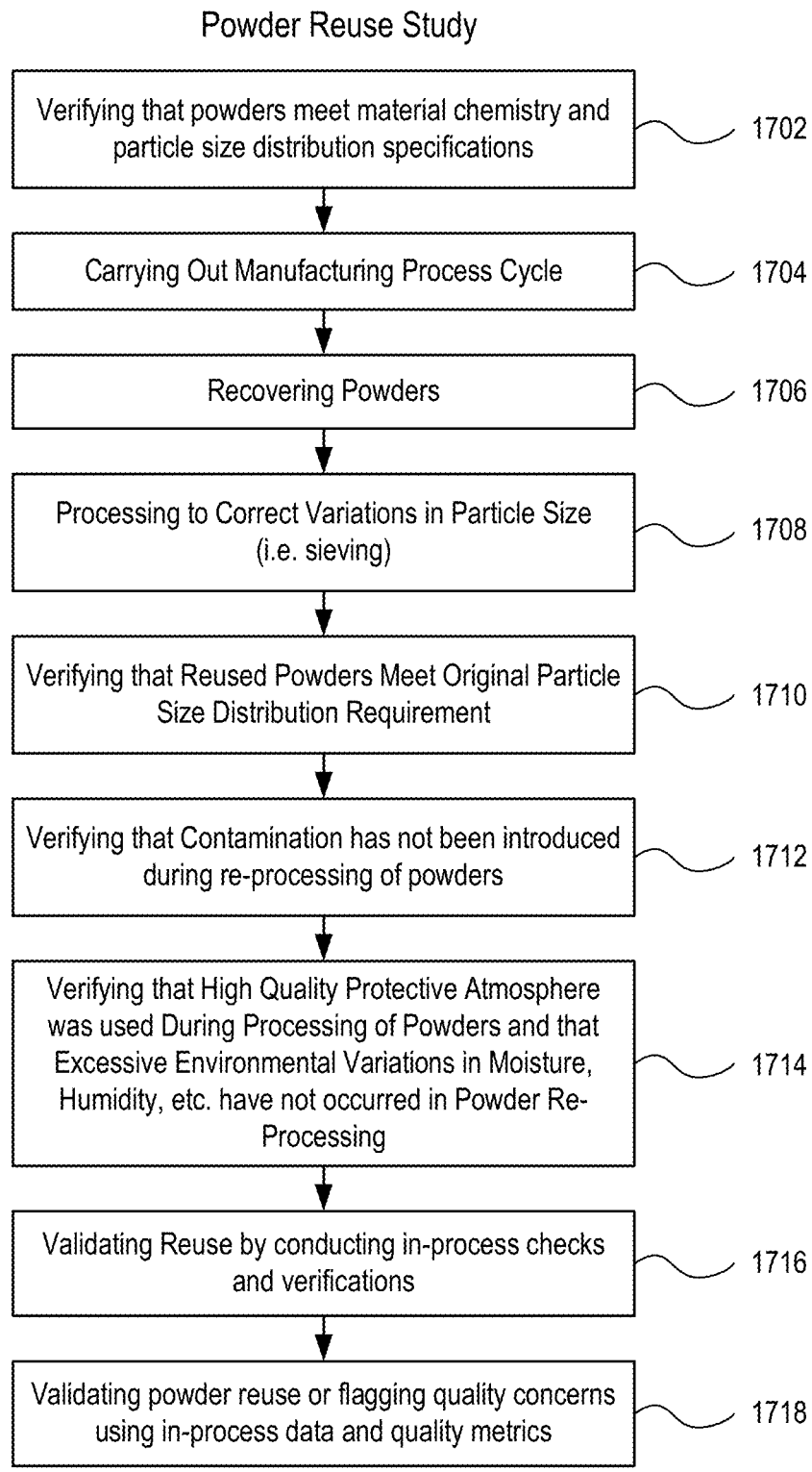
FIG. 17 shows a flow chart depicting a method for carrying out powder reuse after an additive manufacturing operation.

Another question that could arise in the production implementation of AM is powder reuse. When a part or series of parts is made, a large portion of the powders are unused and are not directly sintered by the energy beam. As a result, reuse of the powders can be advantageous on account of minimizing the waste of unused powder. Reuse of the powder often includes ensuring that particle size variations have not inadvertently occurred prior to reuse. The practical question then naturally arises as to how many reuse cycles are permissible before there is a measurable deterioration in quality. The overall reuse process would follow the following series of steps depicted in FIG. 17. At 1702, a verification process can be carried out to determine whether the powder meets material chemistry and particle size distribution specifications. At 1704, a manufacturing process cycle can be carried out. At 1706, any powder unused during the process cycle can be recovered. At 1708, the recovered powders can go through a sieving process that purifies and normalizes a particle size distribution of the recovered powders. At 1710, the powder can again be checked to confirm that the original particle size distribution requirements are met. In some embodiments, this can be carried out as a spot check when little to no variation in the powders is expected. At 1712, the reused powders can be checked for contamination. This could be done chemically or determined during a follow on build operation using in-process sensor measurements. At 1714, the environmental exposure of the powder over time can be considered. Where an environmental exposure threshold is exceeded, oxidation and/or contamination can be checked for more rigorously. At 1716, in—process checks and verifications can be carried out. At 1718, the powder can be validated for reuse or flagged as having a potential safety concern. This process can be used in conjunction with any of the other embodiments, described herein.

It should be appreciated that an in-process verification of powder quality is desirable to ensure that the powder reuse was valid and that the components produced from the reused powders will have the same properties and microstructure as those made from virgin powder. This has tremendous economic significance as it is desirable to reuse powders for as many cycles as possible while still maintaining high part quality and process consistency.

In the following described examples depicted in FIGS. 18A-18F, 718 powders were used nine times and in-process data was collected on each run. So to combine all of these collected data points into one larger data set, we must carefully treat the variances as well as the new global mean value resulting from combining all of these observations. First we note that the new global mean would simply be a weighted mean of the individual means, where the weighting factor is the number of observations in each run (sample). In general, suppose we have G samples, which in this case are the nine samples depicted in FIGS. 18A-18F. Also let n(j) represent the number of observations in the j-th sample. In our case, all samples have an equal number of observations, namely 100 each. Therefore the total number of observations in the larger group resulting from combining all the samples is:

$$N = \sum_{j=1}^{G} n(j) \qquad \text{Eq (1)}$$

We are given the individual means and standard deviations for each group. Furthermore, we note that the global mean, or the mean for the new combined or pooled larger sample, is given by:

$$\text{Global Mean} = \frac{1}{N} \cdot \sum_{j=1}^{G} n(j) \cdot M(j) \qquad \text{Eq(2)}$$

Now we must calculate the new combined or pooled standard deviation. The first step is to consider the individual variances for the each sample and find the error sum of squares. For any given sample j where j is in the range from 1 to G, the individual error sum of squares is given by:

$$ESSG(j) = \sigma_j^2 \cdot \{n(j) - 1\} \qquad \text{Eq (3)}$$

So summing up over all groups, the total error sum of squares for the new combined pooled sample is:

$$ESS = \sum_{j=1}^{G} ESSG(j) = \sum_{j=1}^{G} \sigma_j^2 \cdot \{n(j) - 1\} \qquad \text{Eq (4)}$$

Where s(j) are the individual standard deviations for the individual samples and n(j) is the number of observations in sample j, which again in our case is identical for all samples and is equal to 100. There is another element to the total variance however, and that is deviation between the global mean and the individual means for the individual samples. This deviation is given by:

$$\text{for } j \text{ in the range } [1, G] \, DEV(j) = \{M(j) - GM\} \qquad \text{Eq (5)}$$

Where M(j) are the individual means for the individual samples, and GM is the global mean as calculated by the formula shown above. Then for a given sample, it is possible to define a sample sum of squares error as:

$$GSS(j) = \{M(j) - GM\}^2 \cdot n(j) \qquad \text{Eq (6)}$$

And we can define a total sample sum of squares error as:

$$TGSS = \sum_{j=1}^{G} \{M(j) - GM\}^2 \cdot n(j) \qquad \text{Eq (7)}$$

So then to arrive at the new global variance resulting from pooling these samples into a larger sample and combing their standard deviations, we simply add up ESS and TGSS and divide by the "degrees of freedom," which in this case is N−1. So the new pooled or combined variance is:

$$GV = \frac{\{ESS + TGSS\}}{(N-1)} = \frac{\left[\sum_{j=1}^{G} \sigma_j^2 \cdot \{n(j) - 1\} + \sum_{j=1}^{G} \{M(j) - GM\}^2 \cdot n(j)\right]}{(N-1)} \qquad \text{Eq(8)}$$

And then the new pooled or combined standard deviation is simply given by:

$$\sigma_G = \sqrt{GV} \qquad \text{Eq (9)}$$

Applying these formulae to the data set in question, it is possible to generate the graphs for each of the features showing the global mean, the individual means for each sample, and the upper and lower limits based on the new global standard deviation. For a normal distribution, the vast majority of the data lies within a three sigma band of the mean or central tendency. In fact, 99.7% of the data should lie in this band and therefore a 3 sigma band (i.e. plus or minus 1.5 sigma) is a good way of representing the normal range of variance experienced in any process. For the purposes of statistical process control, the control limits should be set outside this band, and preferably the variation of the samples themselves should be small as compared to the control limits. The series of charts below now shows the following for each feature taking into account the pooled or combined sample statistics: The global mean for each feature, the +1.5 sigma limit above this mean, and the −1.5 sigma limit below this mean. The individual mean values for each feature for each of the nine samples are then plotted as individual data points to show how close or far they appear from the 3 sigma band of the pooled population.

Figure 18A:
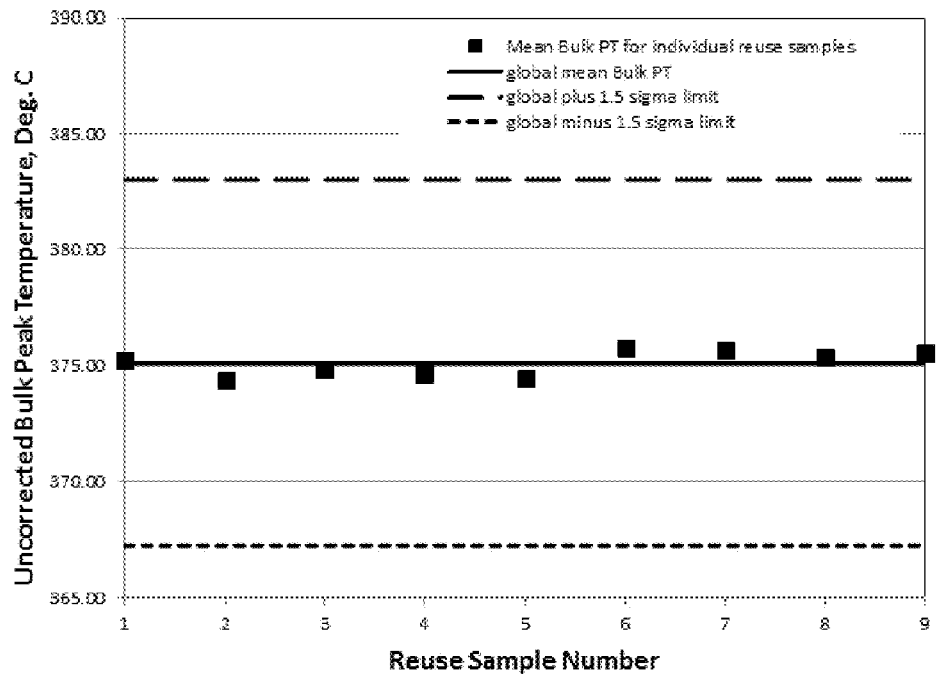
FIGS. 18A-18F show charts depicting the heat signature of the powder is it is reused over a number of different additive manufacturing operations.
Figure 18B:
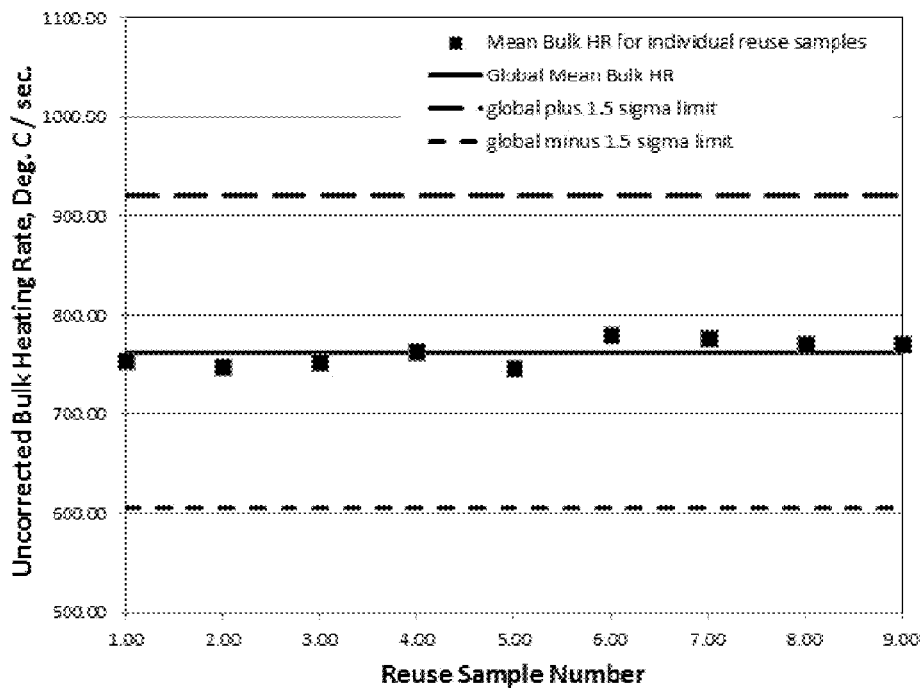
Figure 18C:
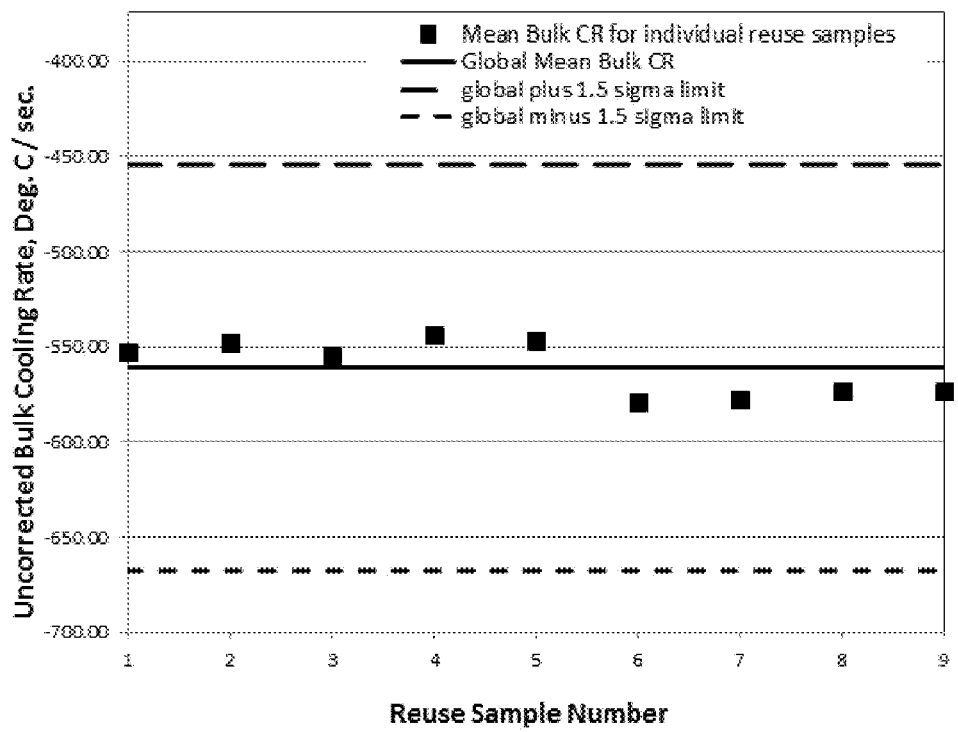
Figure 18D:
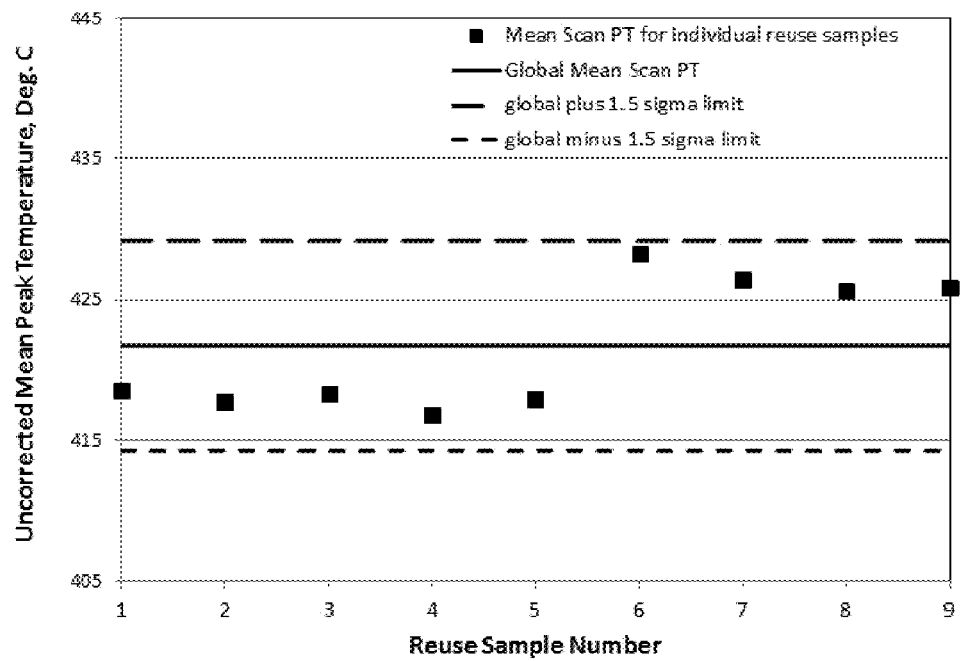
Figure 18E:
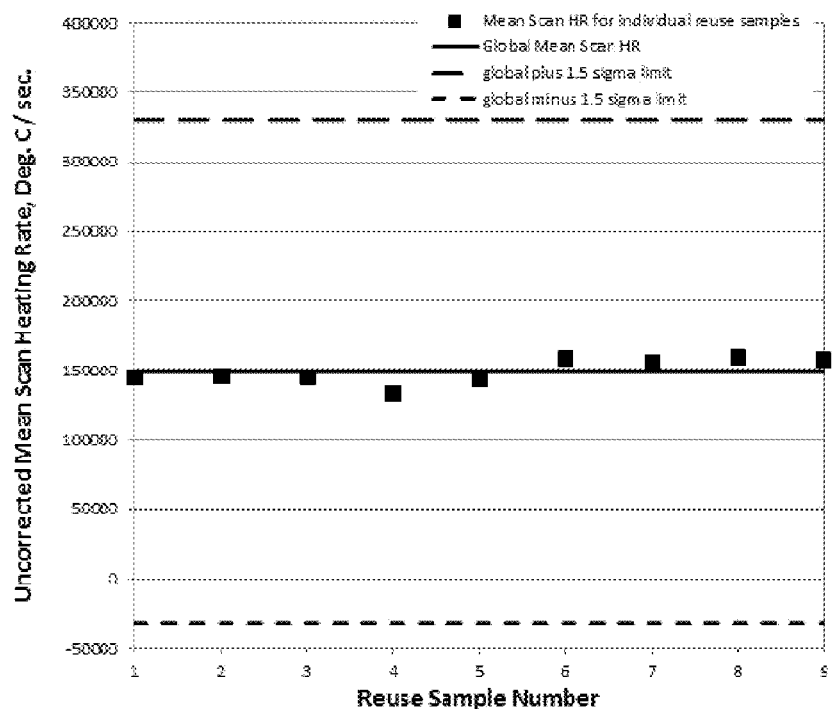
Figure 18F:
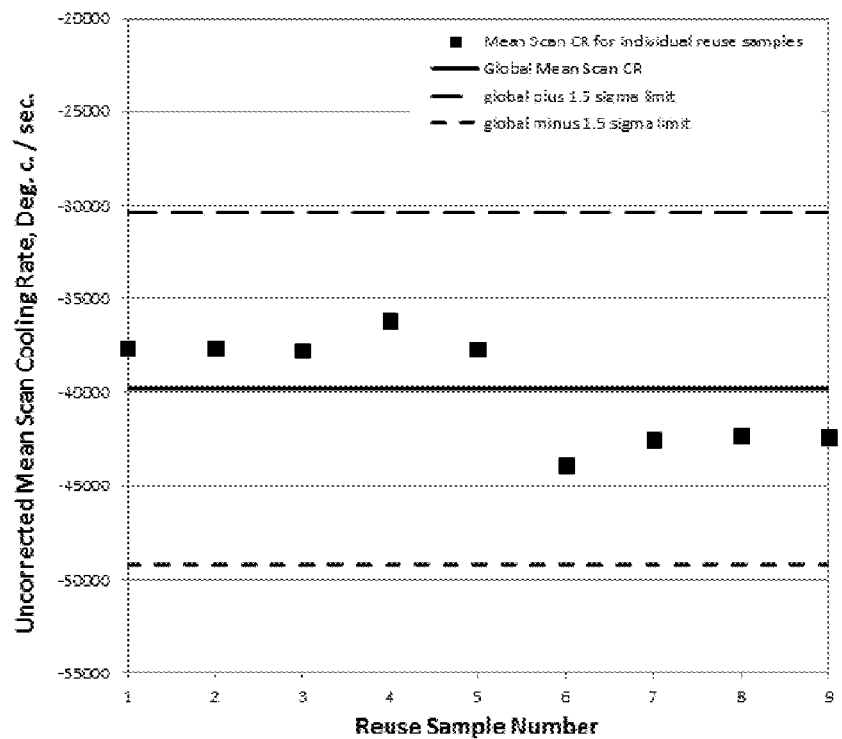

The first set of metrics shown in FIGS. 18A-18C is more closely related to the response of the powder bed and materials which comprises the powder bed when the laser is not in the immediate field of view of the sensor (i.e. bulk level response). In this case, thermal response characteristics can be influenced by variations in material properties such as powder density and thermal conductivity of the powder bed. These properties in turn are influenced by particle size distribution among other powder properties. The second set of metrics is extracted from the real time data which are derived from the time intervals when the laser is directly in the field of view of the sensor (i.e. scan level response depicted in FIGS. 18D-18F). These metrics correspond more directly to the local solidification conditions and are therefore most closely related to as-deposited microstructure and material properties.

So it is seen that for this powder reuse study, the following conclusions may be drawn from a detailed and thorough statistical analysis of the data: (1) the mean values for the various features such as bulk PT, bulk HR, etc. are fairly tightly centered around the global mean obtained by pooling all samples; (2) A normal and typical 3-sigma band was drawn around each global mean for each feature, and the individual means for the various reuse samples were well within this 3-sigma band. The only exception is the Scan PT which for reuse case no. 6 approaches, but does not exceed, the upper 1.5 sigma band above the global mean; and (3) by the standards of statistical process control and looking at these 6 features, it could be said that the reuse of powders as a process is in a state of statistical process control for this example, i.e. the reuse does not introduce additional special causes of variation which would result in a n outlier with respect to the six features examined. In some embodiments, a controller associated with additive manufacturing equipment could be configured to flag a problem when the mean scan peak temperature for a particular run exceeds the global plus 1.5 sigma limit. In this way, material reuse can be halted when the powder has undergone too much change on account of going through too many heating and cooling operations.

Figure 19:
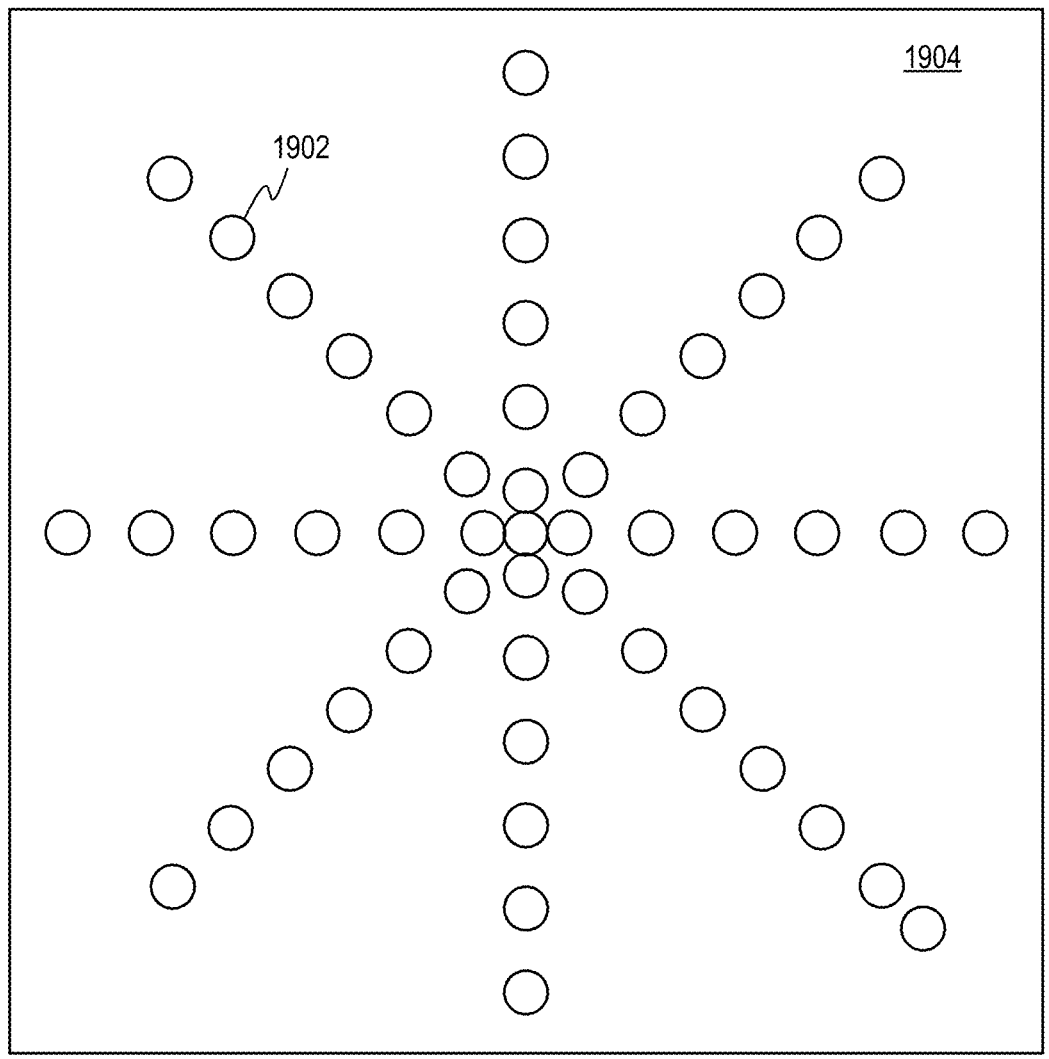
FIG. 19 shows a test pattern for testing material characteristics of a powder prior to using the powder in a production or production development environment.

FIG. 19 shows a test configuration that can be used when a new lot or batch of powder is introduced to see if the new powder behaves the same as previous batches of powders. There are an infinite variety of such test configurations. An example of one such test configuration consisting of right circular cylinders 1902. Such a trial, in addition to the supplied material specifications provided by the supplier, are an important step to verify and validate that the new lot or batch of powders is actually the same when it is run in the AM process, not simply the same on paper and according to the provided specifications. This therefore provides the AM manufacturer an independent means of determining powder equivalence even in the absence of other supporting or corroborating data. In some embodiments, the test pattern can be more widely varied and include features such as overhangs and channels so that the powder can be evaluated in many different ways.

The test configuration depicted in FIG. 19 could also be used to rapidly re-adjust parameters of the process to accommodate differences in particle size distributions or to understand how parameters can be changed so as to compensate for particle size differences. The distribution of right circular cylinders 1902 across build plate 1904 can also help to identify any performance variations across the build plane.

What is claimed is:

1. An additive manufacturing system, comprising:
    a heat source configured to direct energy towards a layer of powder arranged on a powder bed;
    an optical sensing system configured to measure energy radiated from a portion of the layer of powder receiving energy from the heat source; and
    a controller configured to:
        receive sensor data from the optical sensing system during an additive manufacturing operation using a first batch of powder with a test pattern and standardized system parameters to produce a first part;
        compare readings taken by the optical sensing system to readings taken by the optical sensing system during a previous additive manufacturing operation that used a second batch of powder with the test pattern and the standardized system parameters to produce a second part; and
        determine one or more powder characteristics of the first batch of powder from the comparison of the readings.

2. The additive manufacturing system of claim 1, wherein the optical sensing system comprises a pyrometer.

3. The additive manufacturing system of claim 1, wherein in response to the controller identifying differences when comparing the sensor data associated with the first batch of powder to the sensor data associated with the second batch of powder, the controller is further configured to determine whether the differences are a result of unexpected variations of the powder characteristics of the first batch of powder.

4. The additive manufacturing system of claim 3, wherein the controller only identifies differences when the differences exceed a predetermined threshold.

5. The additive manufacturing system of claim 1, wherein the readings taken from the optical sensing system comprise peak temperature of the portion of the layer of powder receiving energy from the heat source.

6. An additive manufacturing method, comprising:
    using a first batch of powder in an additive manufacturing operation;
    carrying out the additive manufacturing operation to produce a first part using a test pattern and standardized parameter settings,
    monitoring the additive machining operation with one or more sensors configured to measure energy radiated during the additive machining operation;
    comparing data recorded by the one or more sensors to data recorded during a previous additive machining operation that produced a second part using a second batch of powder with the test pattern and the standardized parameter settings, wherein the second part has a desired results during additive manufacturing operations; and
    determining one or more powder characteristics of the first batch of powder from the comparison of the data.

7. The additive manufacturing method of claim 6, wherein the powder characteristics comprise an average diameter of particles making up the first batch of powder.

8. The additive manufacturing method of claim 6, wherein monitoring the additive manufacturing operation comprises measuring heating and cooling rates of the first batch of powder.

9. The additive manufacturing method of claim 6, wherein monitoring the additive manufacturing operation comprises measuring peak temperature of the first batch of powder for each layer of the first part.

10. The additive manufacturing method of claim 6, wherein the second part is a calibration part having a plurality of features having varied geometries configured to test various material properties of the first batch of powder.

11. An additive manufacturing method, comprising:
using a first portion of a first batch of powder in an additive manufacturing operation;
carrying out a first additive manufacturing operation to produce a first part using a test pattern and standardized parameter settings;
monitoring the additive machining operation with one or more sensors configured to measure energy radiated during the additive machining operation;
comparing data recorded by the one or more sensors to data recorded during a second additive machining operation that produced a second part using a second batch of powder with the test pattern and the standardized parameter settings;
determining one or more powder characteristics of the first batch of powder from the comparison of the data;
adjusting parameters of a third additive manufacturing operation in accordance with the one or more powder characteristics; and
performing the third additive manufacturing operation with a second portion of the first batch of powder using the adjusted parameters to produce a third part.

12. The additive manufacturing method of claim 11, wherein determining the powder characteristics of the first batch of powder is carried out by a controller in communication with a thermographic sensor.

13. The additive manufacturing method of claim 12, wherein the controller is configured to calculate peak temperature of a portion of each layer while the first part is being manufactured using temperature data provided by the thermographic sensor.

14. The additive manufacturing method of claim 11, wherein the first batch of powder comprises portions of the second batch of powder recovered from the second additive manufacturing operation, and wherein determining one or more powder characteristics of the first batch of powder comprises verifying that the recovered portions of the second batch of powder meets particle size distribution requirements.

15. The additive manufacturing method of claim 14, further comprising:
processing the recovered portions of the second batch of powder to reduce variations in particle size.

16. The additive manufacturing method of claim 14, further comprising:
conducting in-process checks and verification of the recovered portions of the second batch of powder during the third additive manufacturing operation.

* * * * *